United States Patent
Jesme et al.

(10) Patent No.: US 10,971,808 B2
(45) Date of Patent: Apr. 6, 2021

(54) SHIELDED RFID ANTENNA

(71) Applicant: 3M INNOVATIVE PROPERTIES COMPANY, St. Paul, MN (US)

(72) Inventors: Ronald D. Jesme, Plymouth, MN (US); Nicholas T. Gabriel, Woodbury, MN (US); Andrew P. Bonifas, Edmonton (CA); Zohaib Hameed, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/309,186

(22) PCT Filed: Jun. 14, 2017

(86) PCT No.: PCT/US2017/037372
§ 371 (c)(1),
(2) Date: Dec. 12, 2018

(87) PCT Pub. No.: WO2017/218619
PCT Pub. Date: Dec. 21, 2017

(65) Prior Publication Data
US 2019/0334230 A1 Oct. 31, 2019

Related U.S. Application Data

(60) Provisional application No. 62/350,370, filed on Jun. 15, 2016.

(51) Int. Cl.
*H01Q 1/38* (2006.01)
*G06K 19/077* (2006.01)
*H04B 5/00* (2006.01)

(52) U.S. Cl.
CPC .......... *H01Q 1/38* (2013.01); *G06K 19/07749* (2013.01); *H04B 5/0081* (2013.01); *H04B 5/0031* (2013.01)

(58) Field of Classification Search
CPC ........... G06K 7/10366; G06K 7/10316; G06K 7/10009; G06K 19/0723; G06K 7/10356;
(Continued)

(56) References Cited

U.S. PATENT DOCUMENTS 2,249,129 A    7/1941  Grimditch
4,032,921 A *  6/1977  Sikina, Jr. ................ H01Q 9/27
                                                          343/730

(Continued)

FOREIGN PATENT DOCUMENTS

WO   WO 2001-089034   11/2001
WO   WO 2013-147799   10/2013
WO   WO 2013-191178   12/2013

OTHER PUBLICATIONS

International Search report for PCT International Application No. PCT/US2017/037372 dated Nov. 2, 2017, 8 pages.

*Primary Examiner* — Vernal U Brown
(74) *Attorney, Agent, or Firm* — Jonathan L. Tolstedt

(57) ABSTRACT

A shielded antenna (100) includes a spiral antenna (110) and a shield (120) disposed on the spiral antenna. The spiral antenna comprises a plurality of substantially concentric loops. The shield comprises a plurality of electrically isolated electrically conductive segments forming a regular pattern, such that in a top plan view, at least one segment overlaps a portion of at least two loops, and at least one pair of adjacent conductive segments defines an electrically insulative gap therebetween.

10 Claims, 20 Drawing Sheets

(58) Field of Classification Search
CPC .............. G06K 19/0717; G06K 7/0008; G06K 7/10257; G06K 7/10128; G06K 19/07773; H04B 5/0081; H01Q 1/38
USPC ........................................................ 340/10.1
See application file for complete search history.

(56) References Cited

U.S. PATENT DOCUMENTS

| | | | |
|---|---|---|---|
| 7,349,701 B2* | 3/2008 | Lastinger | H01Q 1/246 |
| | | | 455/446 |
| 7,973,722 B1* | 7/2011 | Hill | H01Q 7/08 |
| | | | 343/702 |
| 2010/0120244 A1 | 5/2010 | Lim | |
| 2010/0201596 A1* | 8/2010 | Mieslinger | H04B 5/0081 |
| | | | 343/841 |
| 2011/0121822 A1* | 5/2011 | Parsche | H01Q 7/00 |
| | | | 324/157 |
| 2012/0055998 A1* | 3/2012 | Mieslinger | G06K 19/07771 |
| | | | 235/492 |
| 2017/0187422 A1* | 6/2017 | Hosseini | H04B 5/005 |
| 2017/0213123 A1* | 7/2017 | Geissinger | G06K 19/07 |
| 2019/0042907 A1* | 2/2019 | Buyukkalender | H01Q 1/38 |

\* cited by examiner

SHIELDED RFID ANTENNA

TECHNICAL FIELD

This application relates generally to antenna structures and to devices, systems, and methods related to such antenna structures.

BACKGROUND

Wireless communication circuits are widely used for local communication in a variety of applications. In some applications, wearable devices include communication circuits that are placed next to or in contact with the human body.

BRIEF SUMMARY

Some embodiments involve a shielded antenna that includes a spiral antenna and a shield disposed on the spiral antenna. The spiral antenna comprises a plurality of substantially concentric loops. The shield comprises a plurality of electrically isolated electrically conductive segments forming a regular pattern. When viewed in a top plan view, at least one segment overlaps a portion of at least two loops, and at least one pair of adjacent conductive segments defines an electrically insulative gap therebetween.

According to some embodiments, a radio frequency identification (RFID) tag has a resonant frequency and is adapted to wirelessly communicate with a remote transceiver at the resonant frequency. The RFID tag includes an antenna comprising a plurality of substantially concentric loops and a shield disposed on the antenna. The shield comprises a plurality of electrically isolated metal segments. The shield reduces a free-space quality factor of the antenna by less than about 40% at the resonant frequency. When the RFID tag is placed adjacent an object having a real part of a relative electrical permittivity of about 30 and an electrical resistivity of about 0.125 ohms/meter, with the shield disposed between the antenna and the object, the resonant frequency of the RFID tag shifts by less than about 5%.

In accordance with some embodiments, a shielded antenna includes an antenna and first shield and second shields disposed on the antenna. The first shield comprises a plurality of spaced apart electrically conductive first segments. The second shield comprises a plurality of spaced apart electrically conductive second segments. In a top plan view, at least one first segment partially overlaps each of at least two adjacent second segments, and at least one second segment partially overlaps each of at least two adjacent first segments.

Some embodiments involve a shielded antenna that includes an antenna, a first shield, and a second shield. The first shield is disposed on the antenna and comprises a plurality electrically conductive first segments, the first segments separated by a plurality of first gaps. The second shield is disposed on the antenna and includes a plurality of electrically conductive second segments separated by a plurality of second gaps. In a top plan view, at least one first gap is completely overlapped by a second segment, and at least one second gap is completely overlapped by a first segment.

In accordance with some embodiments, a shielded antenna includes an antenna and a shield disposed on the antenna. The antenna comprises an electrically conductive trace extended along a length of the trace between first and second ends of the antenna. The shield comprises a plurality of spaced apart electrically isolated electrically conductive elongated segments forming a regular pattern. Each segment is elongated along a length direction of the segment, such than in a top plan view, each segment traverses the conductive trace at at least two different locations along the length of the trace. The length direction of the segment is perpendicular to the trace at each of the at least two different locations.

Some embodiments involve a shielded antenna comprising antenna with an electrically conductive elongated trace forming a plurality of substantially concentric loops. A shield is disposed on the antenna. The shield increases a coupling capacitance between the loops by at least a factor of 2 and increases an effective resistance of the elongated trace by less than a factor of 2.

According to some embodiments, a radio frequency identification (RFID) tag has a resonant frequency and is adapted to wirelessly communicate with a remote transceiver at the resonant frequency. The RFID tag includes an antenna and a shield disposed on the antenna. The shield comprises a plurality of electrically isolated electrically conductive segments. Each pair of adjacent conductive segments defines an electrically insulative non-zero width gap therebetween. The non-zero width gap has a width of less than about 1.3 mm. Each segment is elongated and has a length and a width. The width of each segment is less than about 0.2 mm, such that when the RFID tag is placed adjacent an object having a real part of a relative electrical permittivity of about 30 and an electrical resistivity of about 0.125 ohms/meter, with the shield disposed between the antenna and the object, the resonant frequency of the RFID tag shifts less than about 5%.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Some embodiments disclosed herein are directed to flexible and stretchable shielded antenna suitable for near field communication (NFC) applications. The shielded antenna is designed to operate in direct or nearly direct close contact with a human body or other object that has an electrical permittivity greater than free space.

A variation in the moisture content or electrolyte concentration of skin causes a variation in the permittivity or conductivity of the skin, which in turn causes a variation in the antenna performance of typical NFC tags when in close proximity to the skin. Such variation in performance may result in a change in the read range of an NFC tag attached to the body or other dielectric material. The shielded antenna disclosed herein is capable of performing reliably and repeatably adjacent skin regardless of the status of the skin i.e., dry, moist, or degree of perspiration. The disclosed shielded antenna is stretchable and flexible, making it particularly suitable for use with wearable electronic devices.

Figure 1:
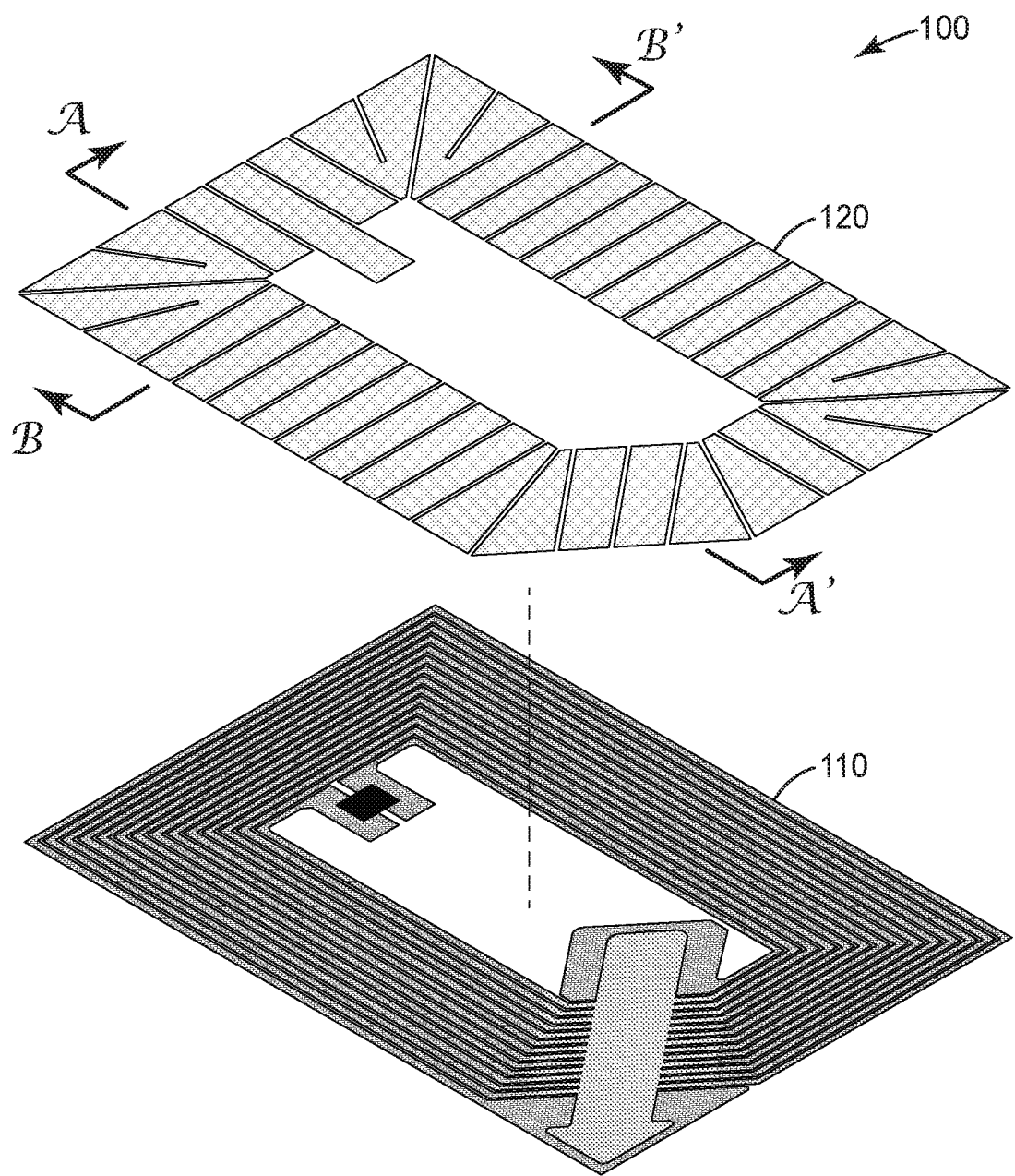
FIG. 1 illustrates a shielded antenna that includes a spiral antenna and a segmented shield disposed on the spiral antenna in accordance with some embodiments.
Figure 2:
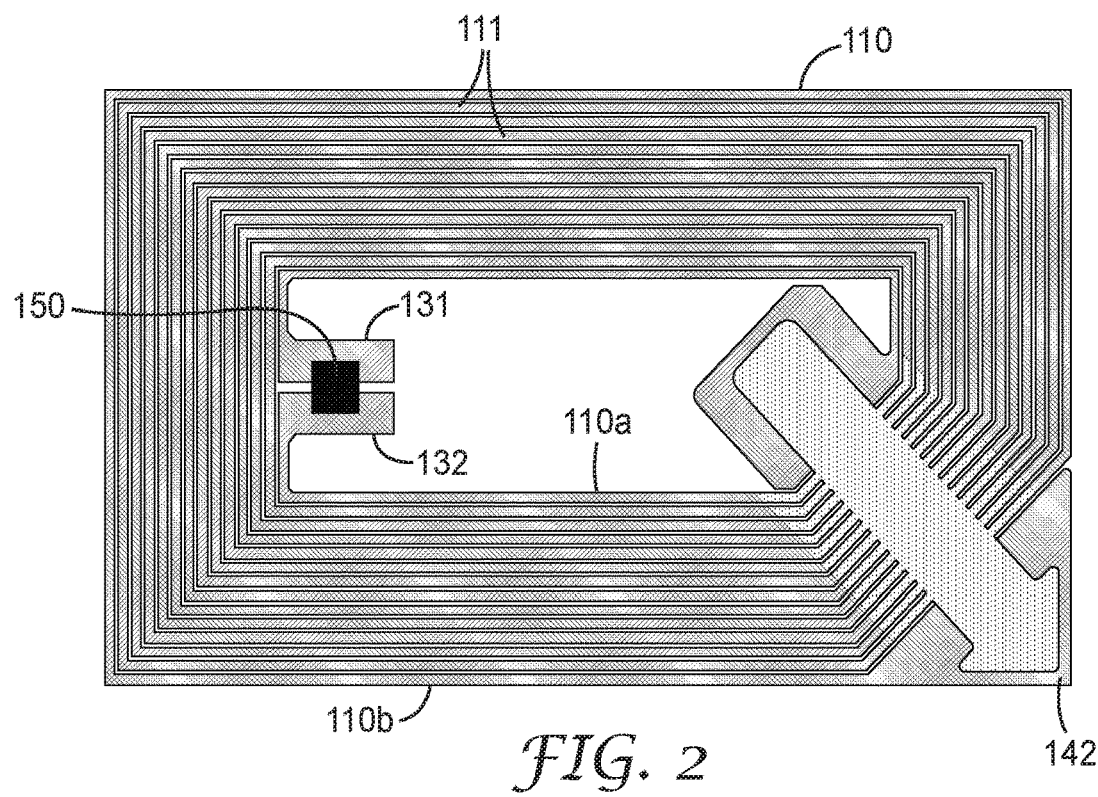
FIG. 2 illustrates a top plan view of the spiral antenna of the shielded antenna of FIG. 1.
Figure 3A:
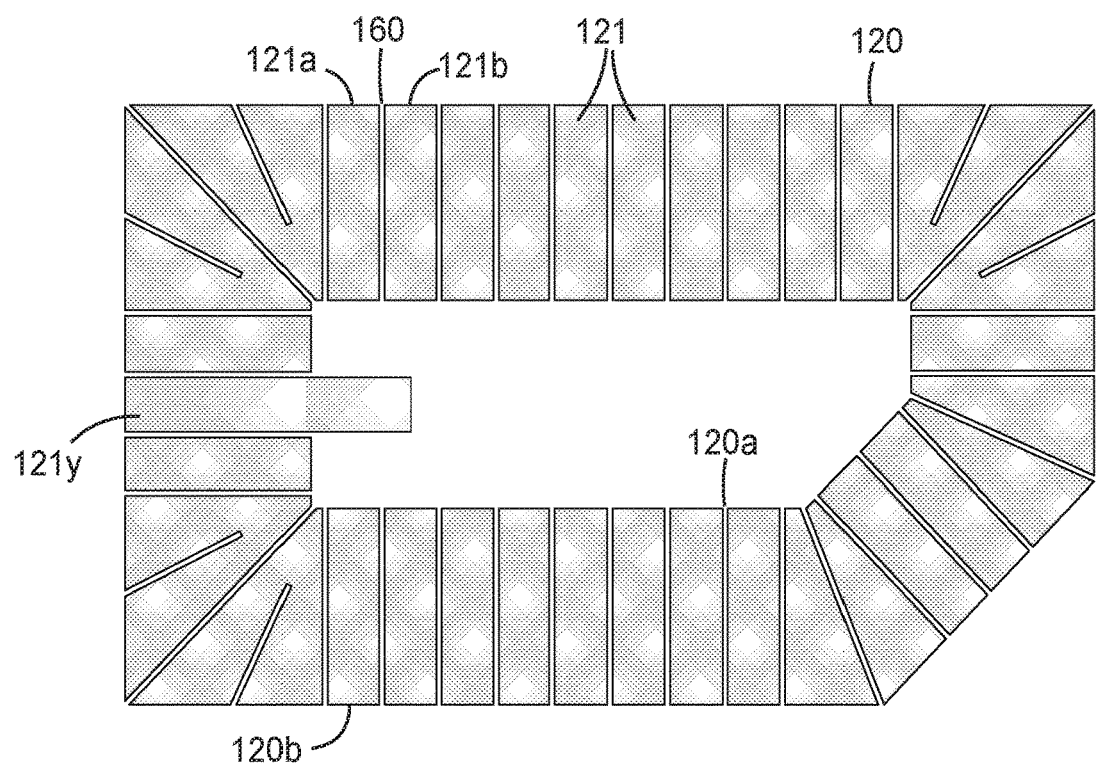
FIG. 3A depicts a top plan view of the segmented shield of the shielded that includes one segment that is substantially co-extensive with a pad portion of the antenna in accordance with some embodiments.

FIG. 1 illustrates a shielded antenna 100 that includes a spiral antenna 110 and a segmented shield 120 disposed on the spiral antenna 110. FIG. 2 illustrates a top plan view of the spiral antenna 110 of the shielded antenna 100. The spiral antenna 110 includes a plurality of substantially concentric loops 111. FIG. 3A depicts a top plan view of the shield 120 of the shielded antenna 100. The shield 120 includes a plurality of electrically conductive segments 121, which may form a regular pattern.

At least some of the conductive segments 121 are electrically isolated from one another. For example, at least one pair 121a, 121b of adjacent conductive segments defines an electrically insulative gap 160 therebetween. The gap 160 electrically isolates the segments 121a, 121b. At least one segment 121a can be electrically floating with respect to one or more other segments 121b. At least the two segments 121a, 121b can be at different potentials. In some embodiments, each pair of adjacent conductive segments 121a, 121b defines an electrically insulative gap 160 therebetween. Each segment may be electrically floating and/or at a different potential with respect to the other segments.

Each conductive segment 121 in the plurality of electrically isolated electrically conductive segments may have any suitable geometric shape. Each of the conductive segments 121 may have the same geometric shape, or some of the conductive segments may have a first shape and other conductive segments may have a different, second shape. At least some of the conductive segments or each conductive segment may have a polygonal or tetragonal shape, for example.

The spiral antenna 110 may have any suitable shape, such as a polygonal shape as shown in FIG. 1. In some embodiments, in a top plan view, the segments 121 cover at least 5%, at least 10%, at least 25%, or even at least 50% of a projected area of the spiral antenna 110.

Each segment 121 extends at least between innermost 120a and outermost 120b perimeters of the shield 120. In a top plan view, the innermost perimeter 110a of the spiral antenna 110 and the innermost perimeter 120a of the shield 120 may be substantially coincident with each other. In a top plan view, the outermost perimeter 110b of the antenna 110 and the outermost perimeter 120b of the shield 120 may be substantially coincident with each other. In some embodiments, the outer perimeter 120b of the shield 120 may extend outwardly beyond the outer perimeter 110b of the antenna 110 and/or the inner perimeter 120a of the shield may extend inwardly beyond the inner perimeter 110a of the antenna 110.

In the top plan view of the shielded antenna 100, at least one segment 121 may overlap a portion of at least two loops 111, a portion of at least three loops, a portion of at least four loops, or a portion of more than four loops of the antenna 110. In some configurations, each segment 121 overlaps a portion of at least two loops 111, a portion of at least three loops, a portion of at least four loops of the antenna 110. In some embodiments, in a top plan view of the shielded antenna, at least one segment 121 or each segment 121 overlaps a portion of each loop 111.

Figure 3B:
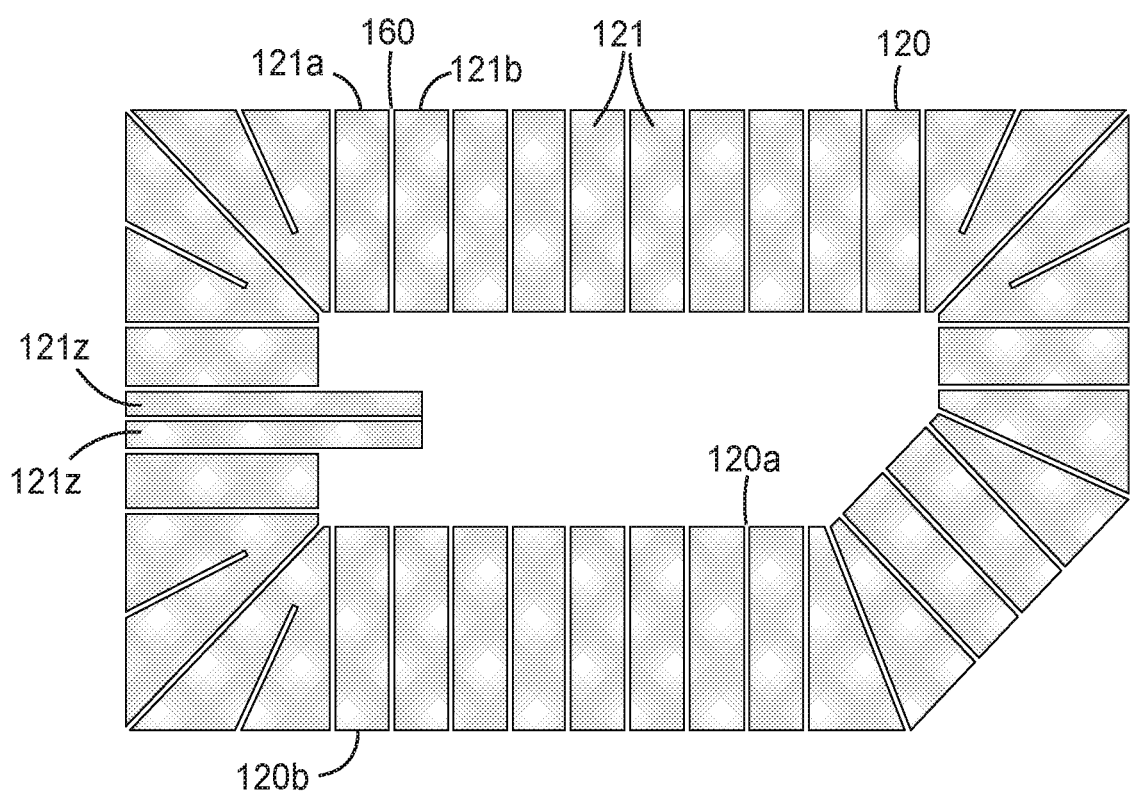
FIG. 3B depicts a top plan view of a segmented shield that includes two or more segments that in combination are substantially co-extensive with a pad portion of the antenna in accordance with some embodiments.

As best seen in FIGS. 3A and 3B, the shielded antenna 100 can include a pad portion comprising pads 131, 132 for mounting an integrated circuit 150. The shield 120 can include a segment 121y that in a top plan view, is substantially co-extensive with the pad portion 131, 132 as shown in FIG. 3A. In some embodiments, the shield 120 includes two or more segments 121z that in combination and in a top plan view, are substantially co-extensive with the pad portion 131, 132 as shown in FIG. 3B.

According to some embodiments, the shield 120 may be disposed only on one side of the spiral antenna 110 as shown in FIG. 1. The shield 120 may be positioned in a wearable electronic device, e.g., an RFID tag, located between the spiral antenna 110 and the human body.

Figure 4A:
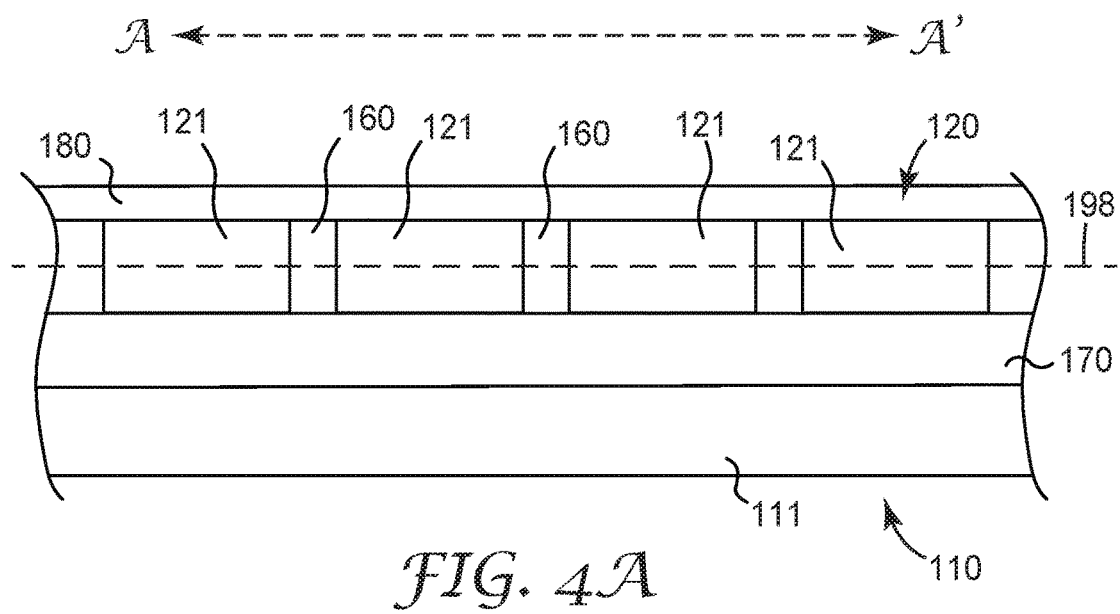
FIGS. 4A and 4B are cross sectional views of the segmented antenna of FIG. 1.
Figure 4B:
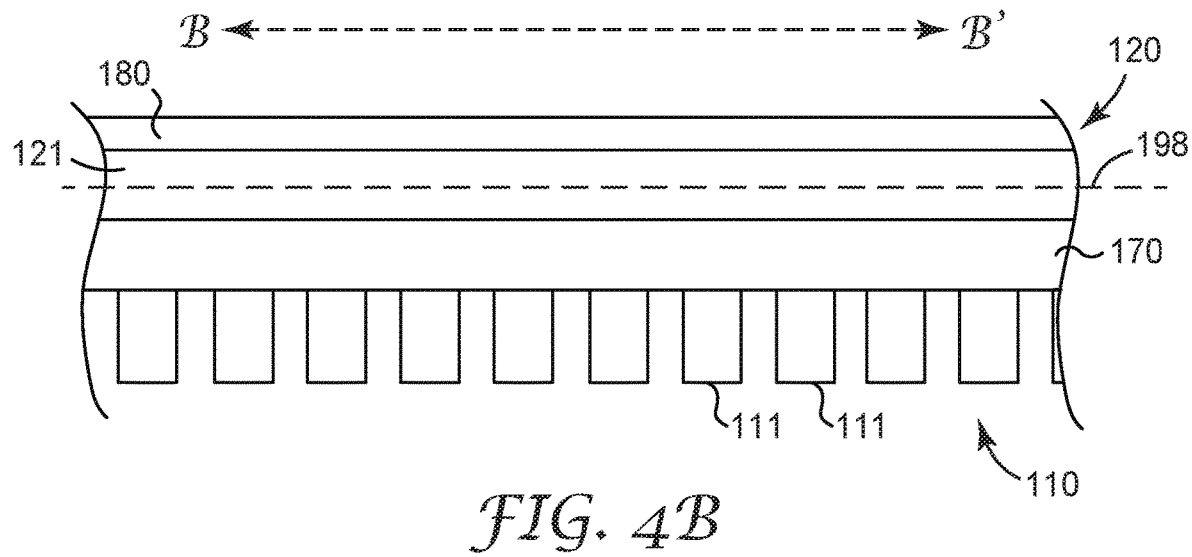

FIG. 4A depicts a cross sectional view of shielded antenna 100 along line A-A' and FIG. 4B depicts a cross sectional view of shielded antenna 100 along line B-B', where lines A-A' and B-B' are also indicated in FIG. 1. As illustrated in FIGS. 4A and 4B, the shield 120 can be substantially planar. The shield may have any suitable shape and the segments may be positioned in any suitable arrangement. In embodiments disclosed herein, the shield and its segments are depicted as being substantially planar, although this need not be the case and non-planar shields and/or segments are also contemplated. Optionally, the conductive segments 121 of the shield 120 may be formed on a substrate 180. As best seen in FIGS. 4A and 4B, an optional dielectric layer 170 may be disposed between the spiral antenna 110 and the shield 120.

FIGS. 1 through 4B illustrate the shielded antenna 100 when it is laid flat. In some embodiments, when laid flat, the electrically isolated electrically conductive segments 121 lie in the same plane indicated by dashed line 198 in FIGS. 4A and 4B. In some embodiments, when the shielded antenna 100 is laid flat, no two conductive segments 121 in the plurality of electrically isolated and electrically conductive segments overlap one another.

Figure 4C:
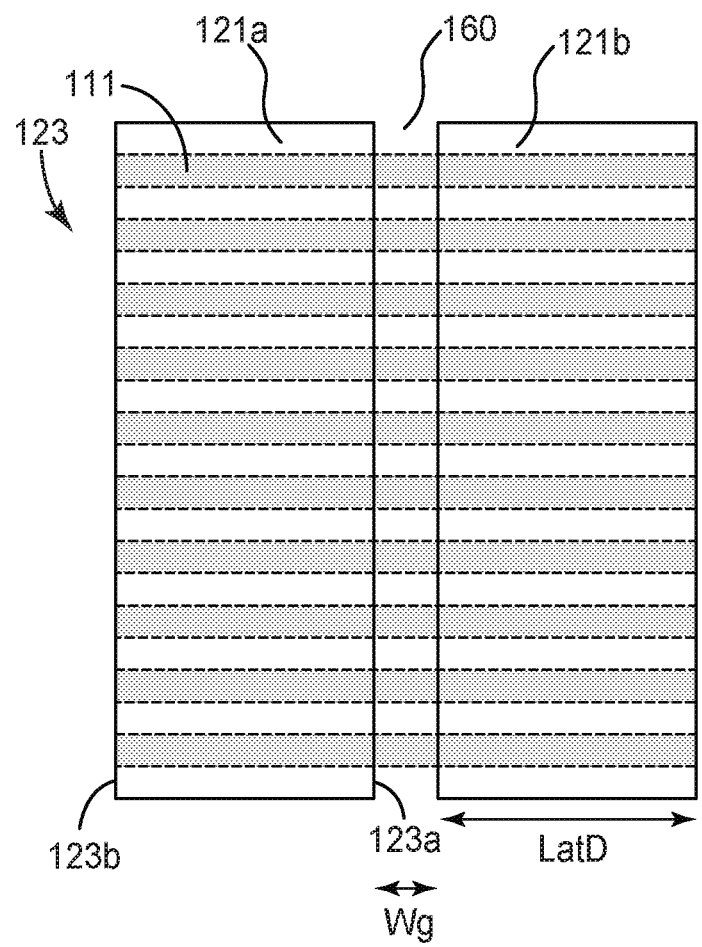
FIG. 4C is a top plan view illustrating a gap between adjacent segments in accordance with some embodiments.

FIG. 4C illustrates a gap 160 between adjacent segments 121a, 121b. The width, Wg, of the gap 160 between adjacent segments 121a, 121b can be less than, equal to, or greater than the lateral dimension, LatD, of the adjacent conductive segments 121a, 121b.

As depicted in FIG. 4C, at least one segment 121a, 121b may overlap a portion of some or all of the loops 111 of the antenna. FIG. 4C illustrates, in top plan view, two segments 121a, 121b that each overlap 10 antenna loops 111. At least one conductive segment 121a may overlap a portion of some or all of the loops 111 in an overlap region 123. A first edge 123a of the at least one conductive segment 121a may be substantially perpendicular to the loop 111 at the overlap region 123. A different second edge 123b of the segment 121a may also be substantially perpendicular to the loop 111 at the overlap region 123.

Figure 4D:
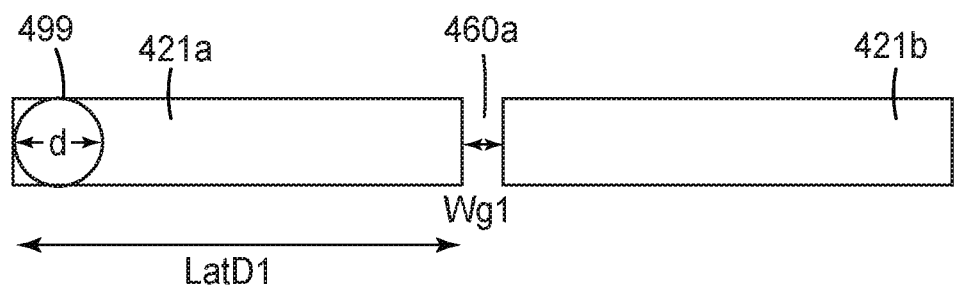
FIGS. 4D and 4E illustrate the relationship between the width of the gap between adjacent segments and the lateral dimension of the adjacent conductive segments in accordance with some embodiments.
Figure 4E:
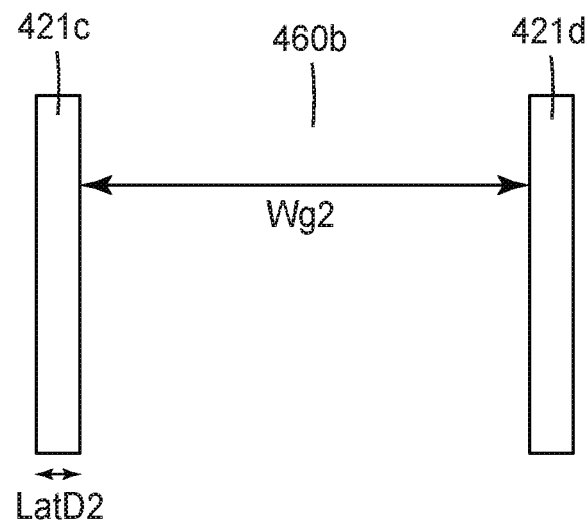

FIG. 4D shows, in top plan view, two adjacent electrically conductive segments 421a, 421b with a gap 460a between adjacent segments 421a, 421b. As illustrated by FIG. 4D, in some embodiments, the maximum width, Wg1, of the gap 460a can be at least 10 times smaller than a minimum lateral dimension, LatD1, of each adjacent conductive segment 421a, 421b. As also indicated in FIG. 4D, for at least one segment 421a, 421b, a diameter, d, of a largest circle 499 inscribed in the at least one segment 421a may be at least 5 times smaller than a largest lateral dimension LatD1 of the at least one segment 421a. FIG. 4E shows, in top plan view, two adjacent segments 421c, 421d with a gap 460b between adjacent segments 421c, 421d. As illustrated in FIG. 4E, in some embodiments, a minimum width, Wg2, of the gap 460b can be at least 10 times greater than a maximum lateral dimension, LatD2, of each adjacent conductive segment 421c, 421d.

Figure 5:
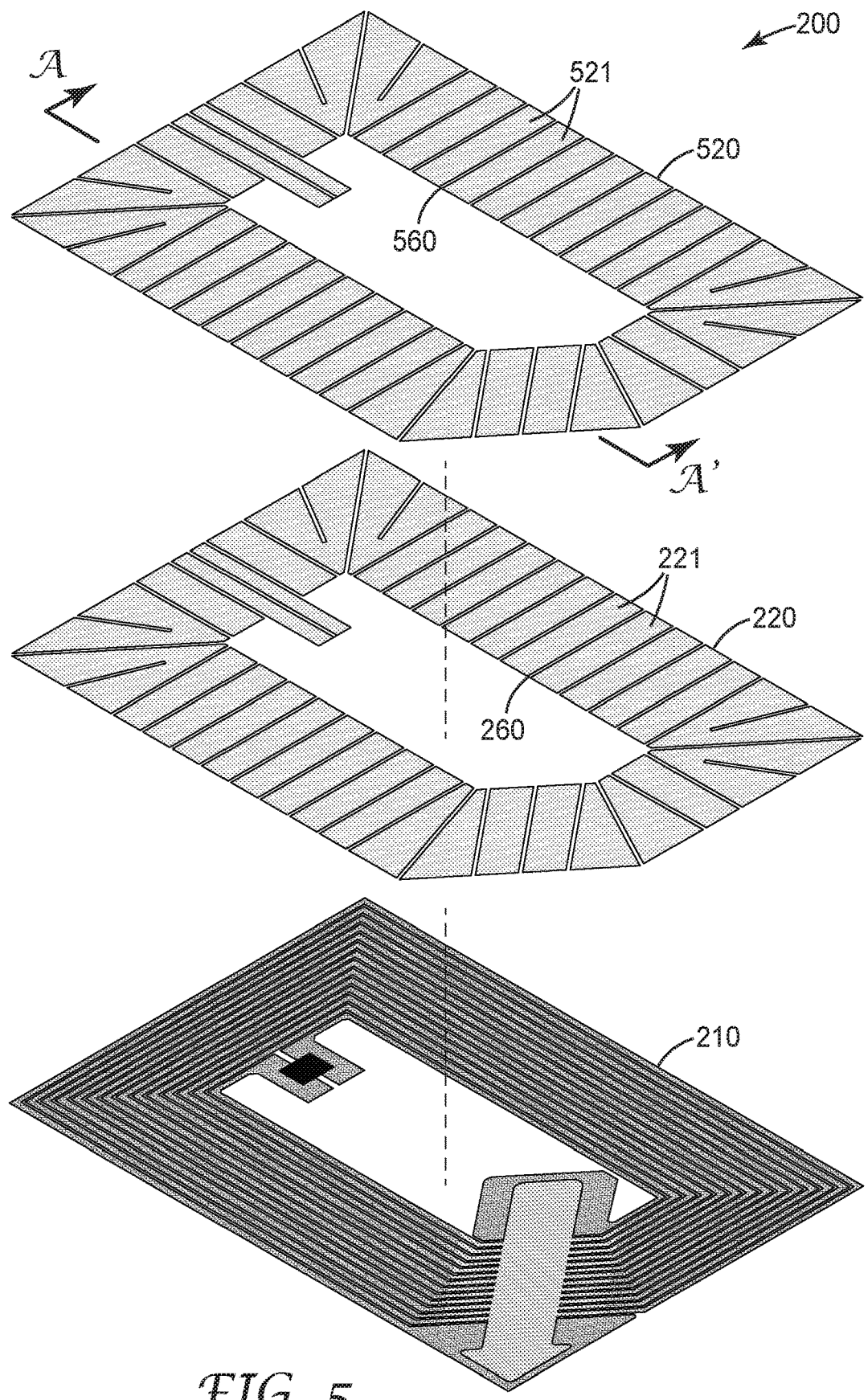
FIG. 5 depicts a shielded antenna having two segmented shields in accordance with some embodiments.

As depicted in the perspective view of FIG. 5, in accordance with some embodiments, a shielded antenna 200 may include multiple shields. FIG. 5 shows a shielded antenna 200 that includes an antenna 210, a first shield 220 and a second shield 520. The first shield 220 is disposed on the antenna 210 and includes a plurality of spaced apart electrically conductive first segments 221. The first segments 221 are separated by first gaps 260. A second shield is disposed on the antenna 210 and includes a plurality of spaced apart electrically conductive second segments 521. The second segments 521 are separated by second gaps 560. As illustrated in FIG. 5, the first 220 and second 520 shields are disposed on the same side of the antenna 210. The first shield 220 is disposed between the antenna 210 and the second shield 520.

Figure 6A:
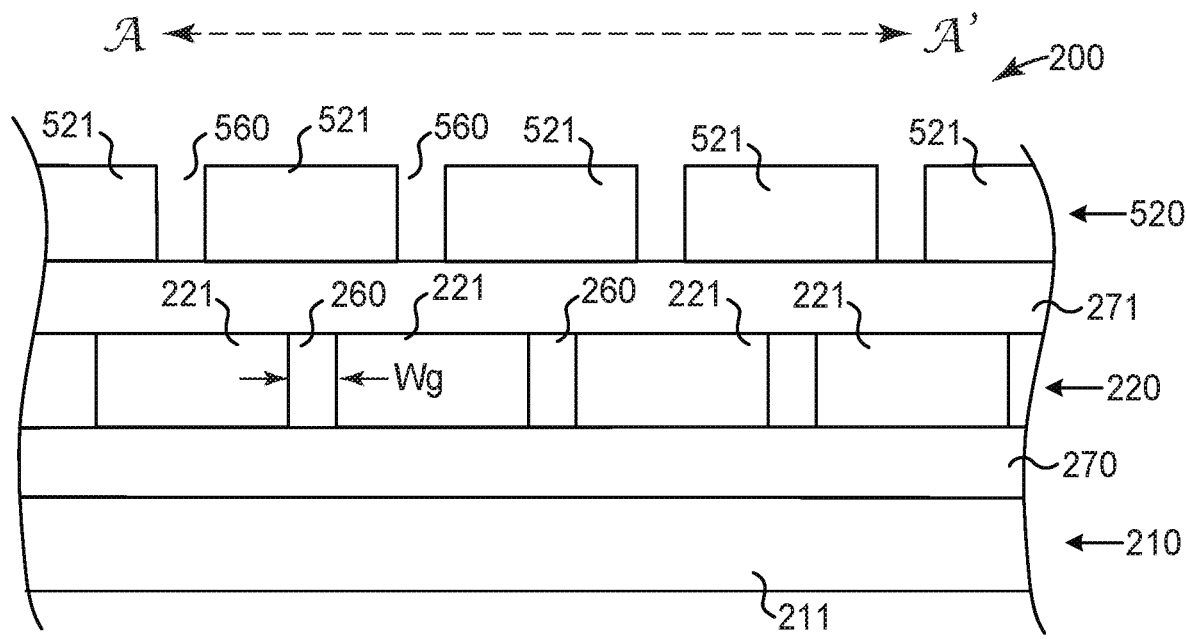
FIG. 6A is a cross sectional view of the shielded antenna of FIG. 5.
Figure 6B:
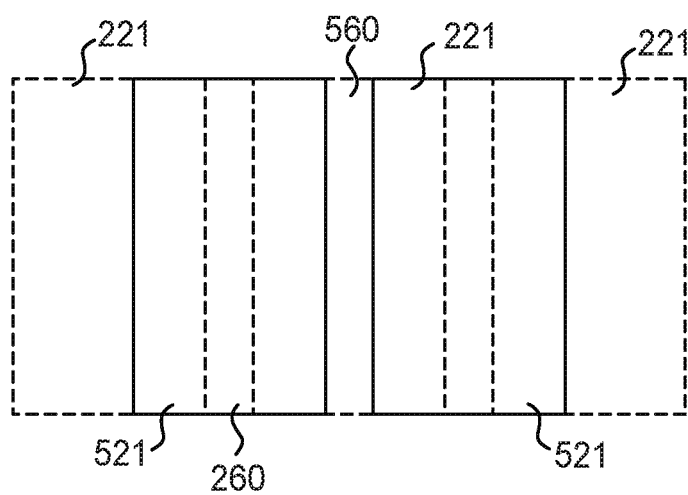
FIG. 6B is a top plan view showing segments of the first and second shields of the shielded antenna of FIG. 5.

FIG. 6A is a cross sectional diagram illustrating the shielded antenna 200 of FIG. 5 taken through line A-A' which is also indicated in FIG. 5. FIG. 6B is a top plan view showing some of the segments 221, 521 of the first and second shields 220, 520. In the top plan view depicted in FIG. 6B, at least one first segment 221 at least partially overlaps each of at least two adjacent second segments 521, and at least one second segment 521 at least partially overlaps each of at least two adjacent first segments 221. In some embodiments, each first segment 221 partially overlaps each of at least two adjacent second segments 521 and each second segment 521 partially overlaps each of at least two adjacent first segments 221. In some embodiments, when viewed in top plan view, at least one first gap 260 is completely overlapped by a second segment 521, and at least one second gap 560 is completely overlapped by a first segment 221. In some embodiments, each first gap 260 is completely overlapped by a second segment 521, and each second gap 560 is completely overlapped by a first segment 221 in accordance with some embodiments.

Figure 7A:
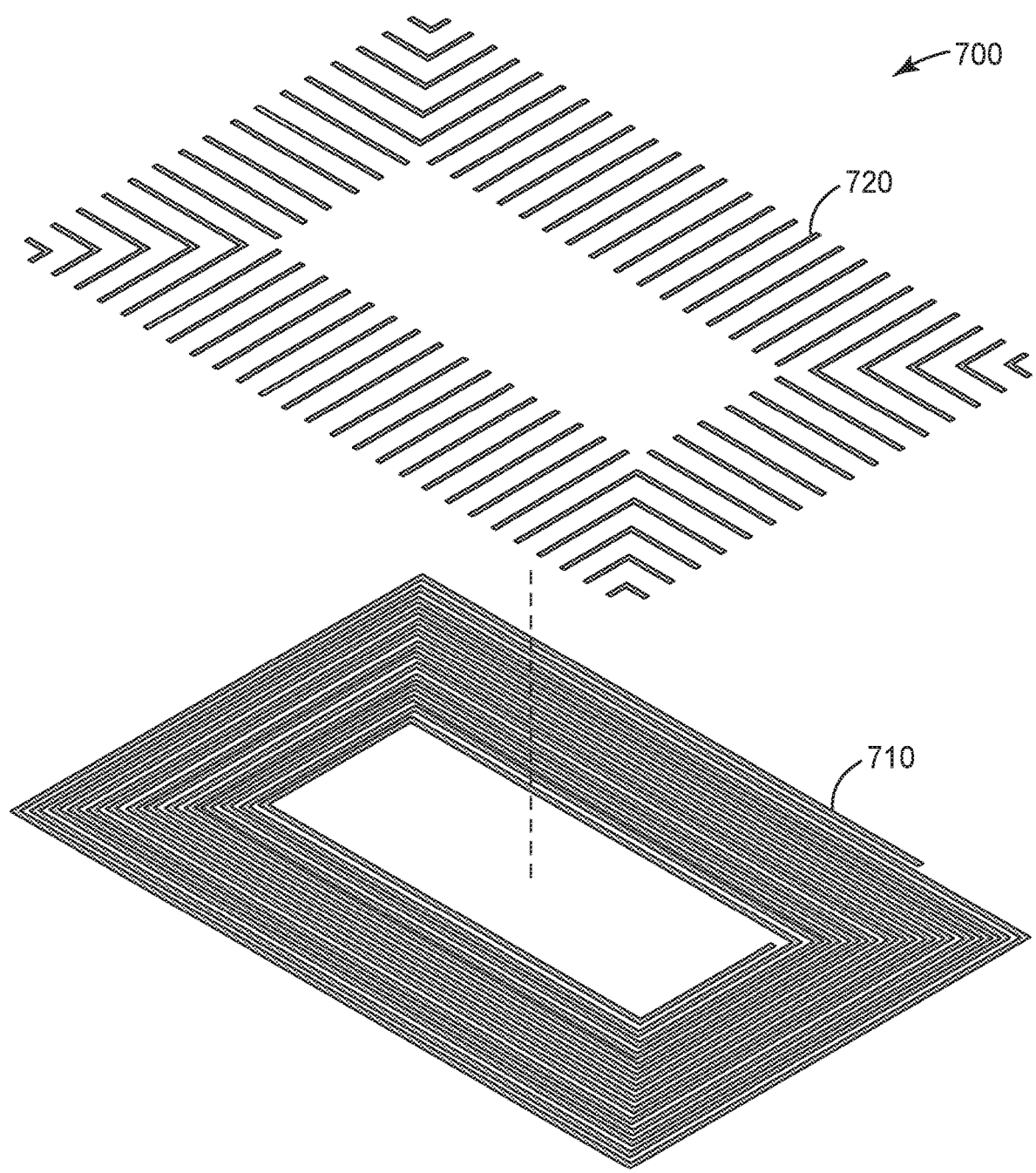
FIG. 7A is a perspective view of a shielded antenna in accordance with some embodiments.
Figure 7B:
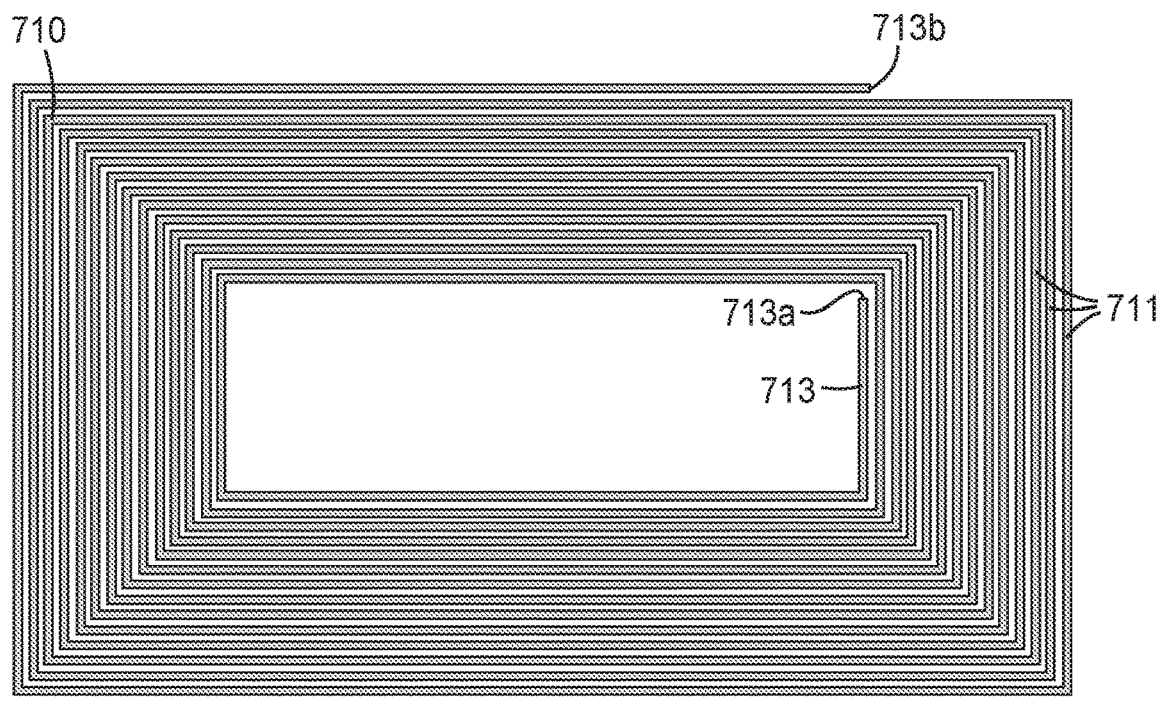
FIG. 7B is a top plan view of the antenna of the shielded antenna of FIG. 7A
Figure 7C:
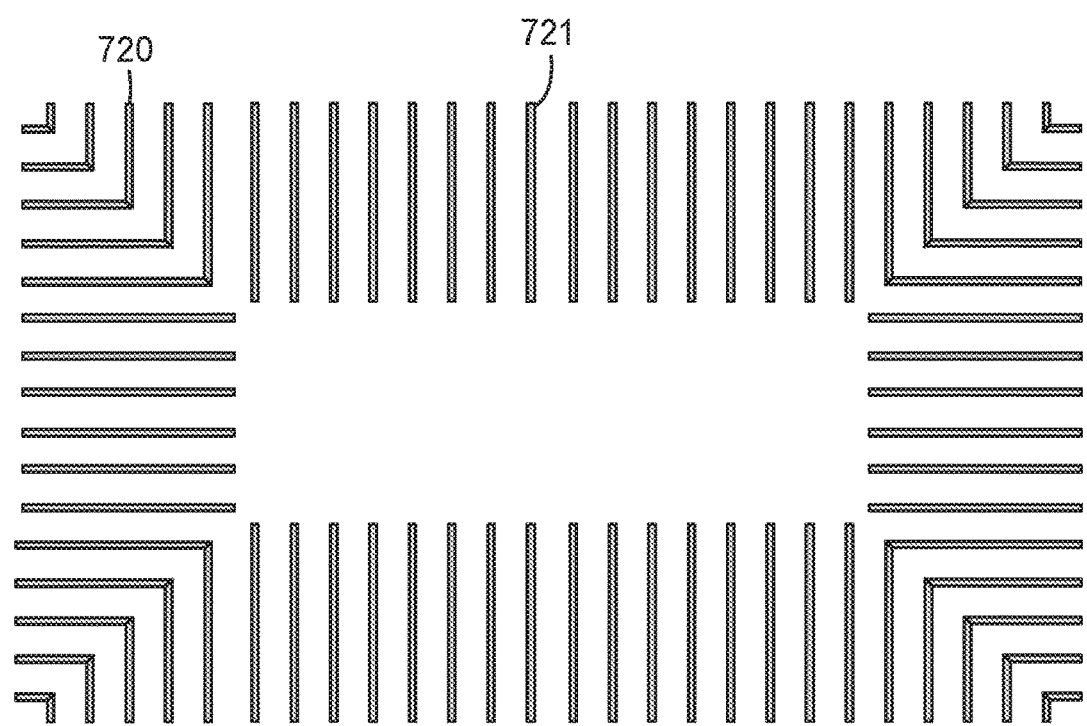
FIG. 7C is a top plan view of the shield of the shielded antenna of FIG. 7A.
Figure 7D:
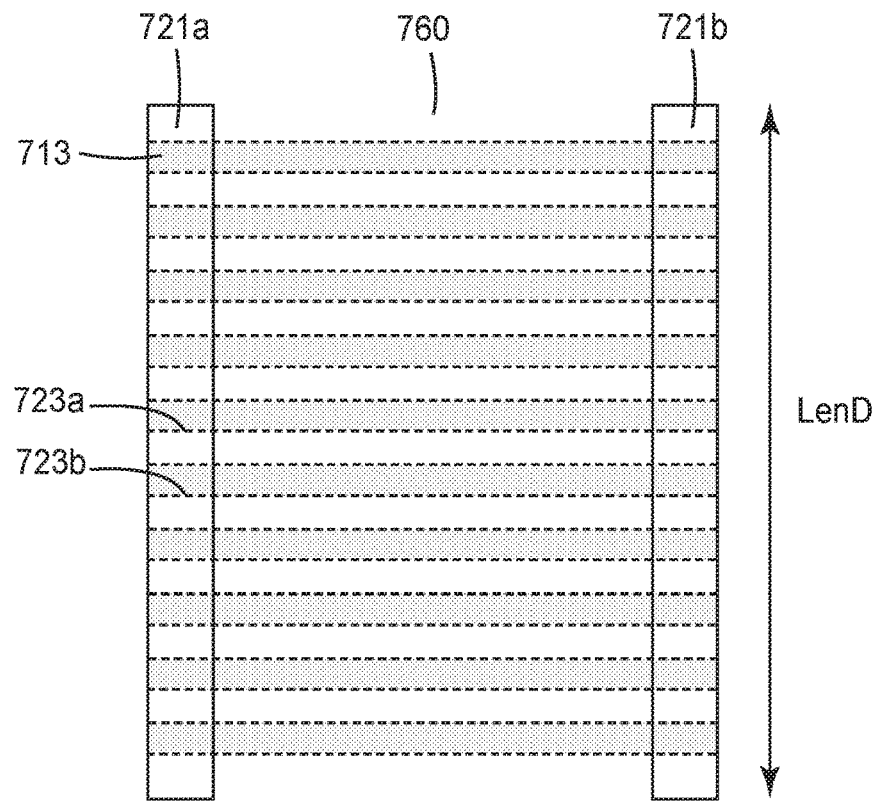
FIGS. 7D and 7E are top plan views showing some of the shield segments overlapping the antenna trace of the shielded antenna of FIG. 7A.
Figure 7E:
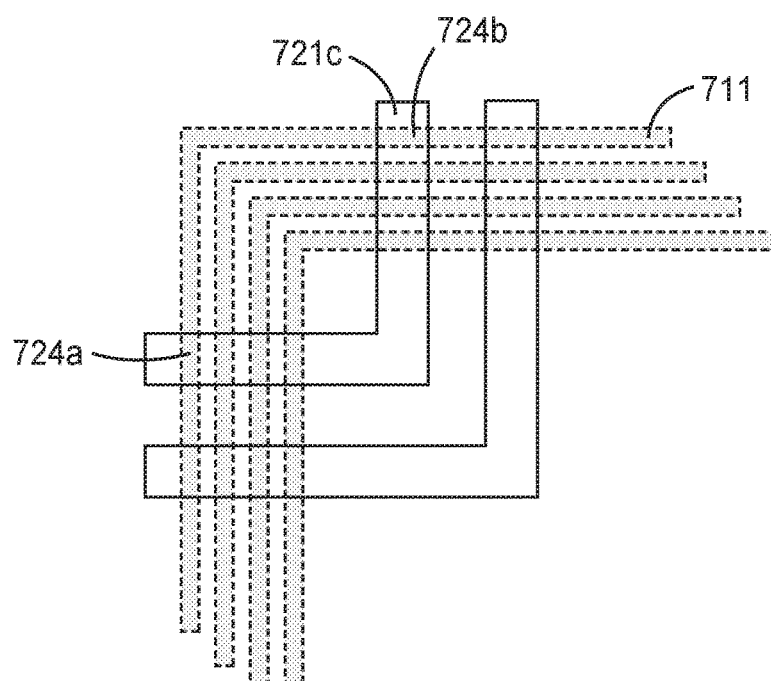

FIG. 7A is a perspective view of a shielded antenna 700 in accordance with some embodiments. FIGS. 7B and 7C, respectively, are top plan views of the antenna 710 and the shield 720 of the shielded antenna 700. FIGS. 7D and 7E are top plan views depicting some of the shield segments overlapping the antenna trace 713. FIGS. 7A through 7E illustrate a shielded antenna 700 having an antenna 710 comprising an electrically conductive trace 713 that extends along a length of the trace 713 between first 713a and second 713b ends of the trace 713 of the antenna 710. The trace 713 may be arranged in a spiral that forms multiple concentric loops 711. A shield 720 is disposed on the antenna 710. The shield 720 includes a plurality of spaced apart electrically isolated electrically elongated conductive segments 721 forming a regular pattern. In some embodiments, as illustrated in the top plan view of FIG. 7C and the close up top plan view of a portion of the shielded antenna in FIG. 7D, at least some segments 721a, 721b separated by gap 760 have portions that are elongated along the length direction, LenD. In a top plan view, each segment 721a, 721b traverses the conductive trace 713 at at least two different locations 723a, 723b along the length of the trace 713. In some embodiments, as illustrated in the top plan view of FIG. 7C and the close up top plan view of a portion of the shielded antenna in FIG. 7E, at least one conductive segment 721c overlaps two spaced apart portions 724a, 724b of a same loop 711. FIG. 7C illustrates a shield 720 wherein at least some of the elongated segments 721h are substantially L-shaped. FIG. 7C illustrates a shield 720 wherein at least some of the elongated segments 721d, 721e are substantially perpendicular to at least some other elongated segments 721f, 721g.

Figure 8A:
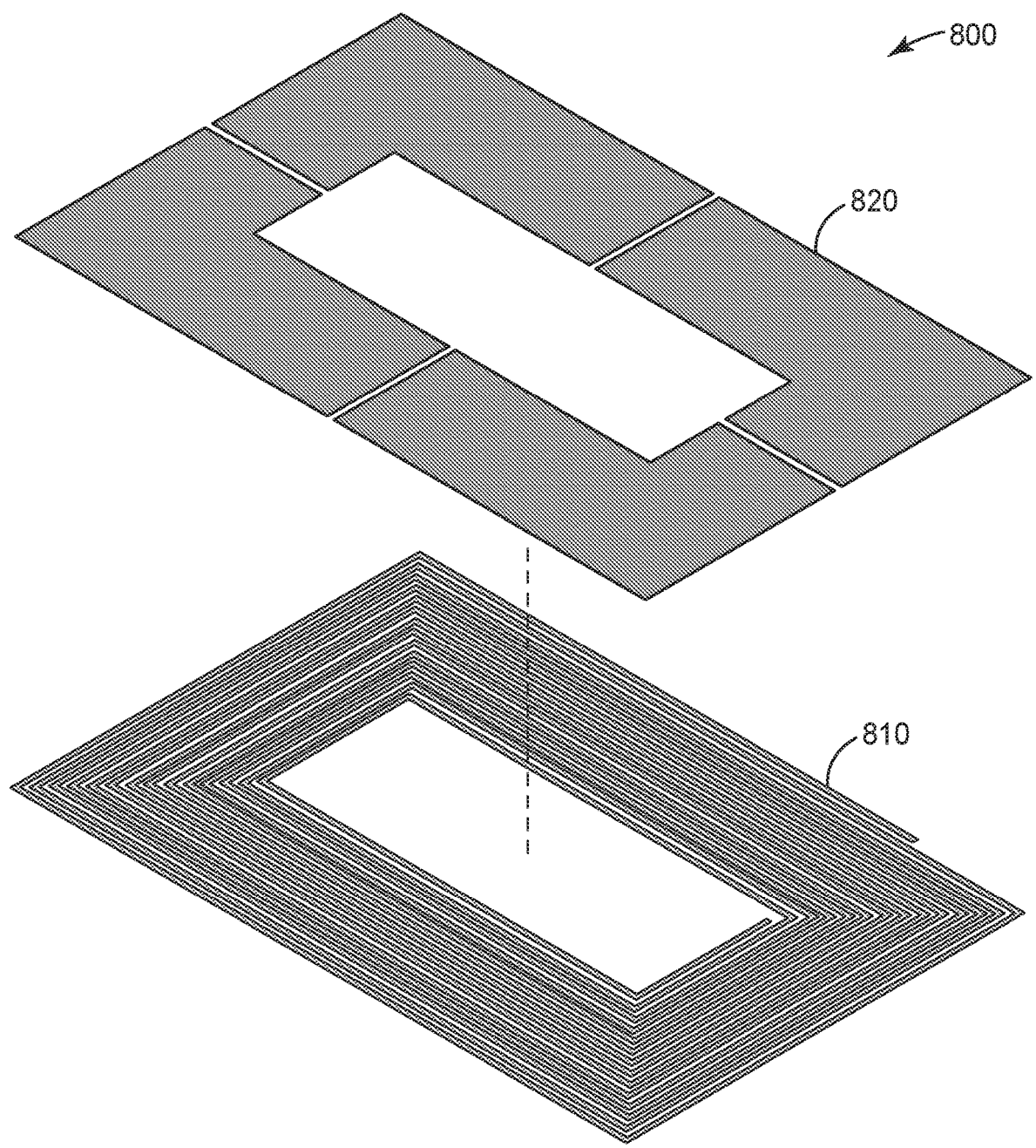
FIG. 8A depicts a segmented shield having four L-shaped segments separated by four gaps in accordance with some embodiments.
Figure 8B:
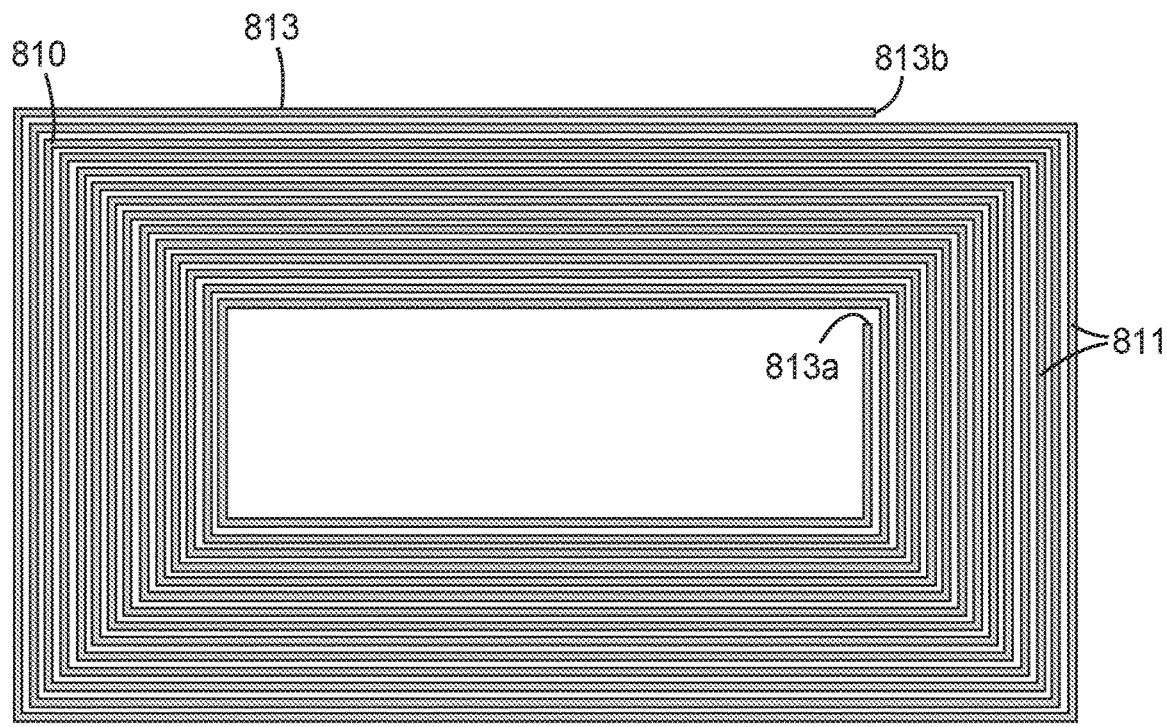
FIG. 8B shows a plan view of the antenna of FIG. 8A.
Figure 8C:
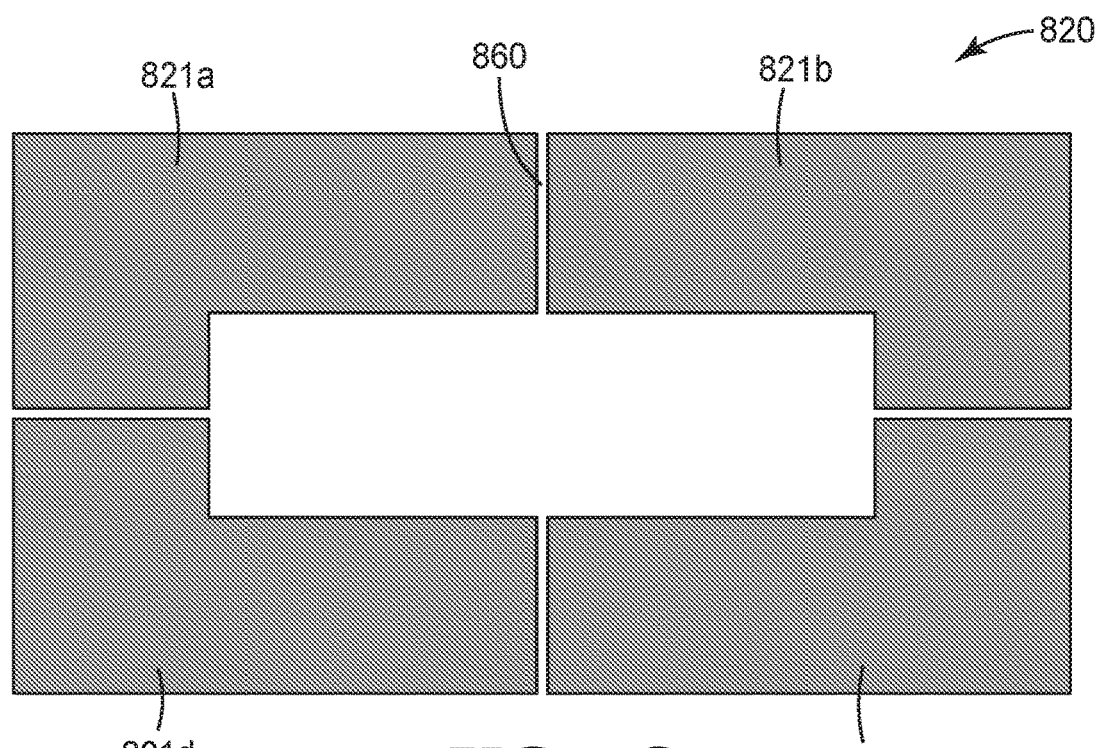
FIG. 8C shows a plan view of the shield of FIG. 8A.
Figure 8D:
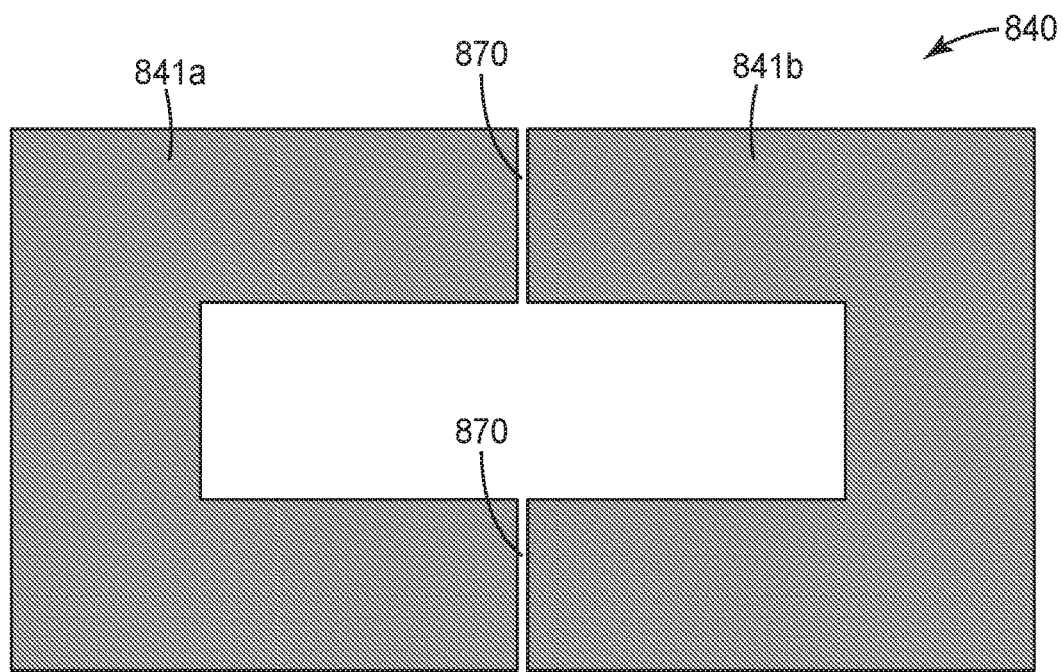
FIG. 8D depicts a plan view of a segmented shield having two U-shaped segments separated by two gaps in accordance with some embodiments.

FIG. 8A is a perspective view of a shielded antenna 800 comprising an antenna 810 and segmented shield 820 in accordance with some embodiments. FIG. 8B illustrates a top plan view of the antenna 810 which comprises an electrically conductive trace 813 that extends along a length of the trace 813 between first 813a and second 813b ends of the trace 813 of the antenna 810. The trace 813 may be arranged in a spiral that forms multiple concentric loops 811. FIG. 8C illustrates a top plan view of the shield 820 comprising spaced apart electrically conductive segments 821a, 821b, 821c, 821d separated by gaps 860. In this embodiment, each segment 821a, 821b, 821c, 821d of the shield 820 is substantially L-shaped. FIG. 8D illustrates a shield 840 having electrically conductive segments 841a, 842b separated by gaps 870, wherein the segments 841a, 842b are substantially U-shaped. The L-shaped and U-shaped segments of FIG. 8C and FIG. 8D, respectively, overlap two spaced apart portions of the same loop 811 of antenna 810, as previously discussed in connection with the L-shaped segment 721c of FIG. 7E.

The conductive segments illustrated in FIGS. 1-8 could be made of any suitable electrically conductive material. For example, the conductive segments may comprise a metal or metal alloy. The conductive segments may comprise one or more of copper, silver, gold, nickel, tin, carbon, carbon black, aluminum, indium, zinc, silicon, iron, tungsten, platinum, titanium, and/or lead. In some embodiments, the conductive segments comprise at least two different materials. The conductive segments may comprise electrically conductive particles dispersed in a resin, for example. Each segment of the shield may have an electrical sheet resistance less than about 10 ohms/square, less than about 1 ohms/square, less than about 0.3 ohms/square, less than about 0.1 ohms/square, less than about 0.05 ohms/square or even less than about 0.01 ohms/square.

According to some embodiments, the electrical conductivity of at least one conductive segment can be greater than about $1.0 \times 10^7$ mhos/meter, or greater than about $2.0 \times 10^7$ mhos/meter. According to some embodiments, the electrical conductivity of each conductive segment is greater than about $1.0 \times 10^7$ mhos/meter, or greater than about $2.0 \times 10^7$ mhos/meter.

According to some embodiments, the real part of a relative magnetic permeability of at least one conductive segment may be in a range from about 1 to about 10 at room temperature and a frequency of about 10 MHz. According to some embodiments, the real part of a relative magnetic permeability of each conductive segment is in a range from about 1 to about 10 at room temperature and a frequency of about 10 MHz. In some embodiments, the shield increases a coupling capacitance between the loops of the antenna by at least a factor of 2 and increases an effective resistance of the elongated trace by less than a factor of 2.

The shielded antennas described herein is suitable for use in electronics systems that are temporarily (e.g., 1-7 days) adhered to the human body to enable authentication and sensing applications that would otherwise be less viable. Without being bound to any particular theory, changes in near field coupling of an antenna placed near the human body may be due a varying permittivity in close proximity to the antenna, causing in a change in inter-winding parasitic capacitance of the antenna. The relative permittivity of free-space is 1, while the relative permittivity of skin is variable and may range from about 20 to 60. The higher relative permittivity of skin in proximity to the antenna reduces the read range of the antenna due to a significant shift in resonant frequency and in some cases a reduction in the quality factor of the resonance. Shielding reduces the effect of the higher relative permittivity of the skin, however, shielding can result in losses causing energy dissipation in the antenna due to eddy currents induced in the shield.

The shielded antennas disclosed herein are configured to perform well without regard to the variability that skin could otherwise introduce, due to its wide range of permittivity under various hydration conditions. The shield is configured to electrically shield the multiple turn antenna from the variable dielectric of the body, without substantial adverse effect on the magnetic fields required for the near field coupling. The disclosed shielded antenna configurations reduce antenna sensitivity to the presence of skin, and segmentation allows the shielded antenna to flex and stretch with the skin.

Figure 9A:
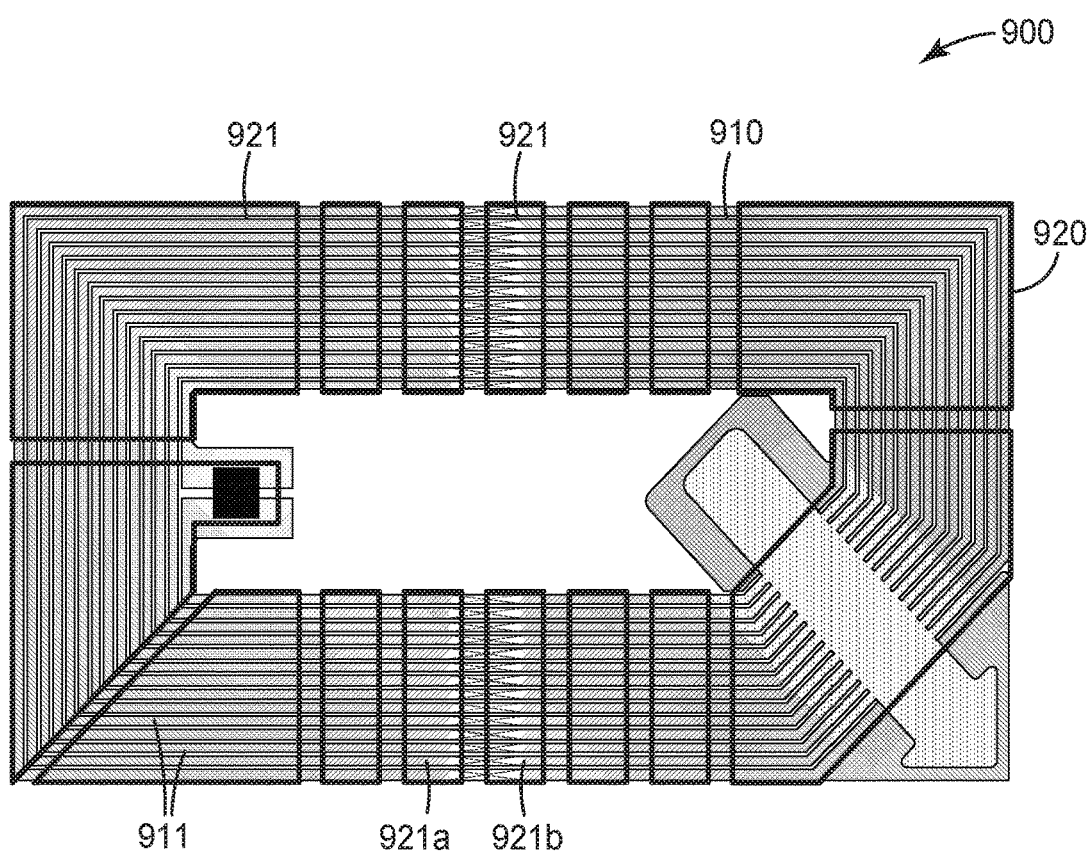
FIG. 9A depicts a radio frequency identification (RFID) tag having a resonant frequency and adapted to wirelessly communicate with a remote transceiver at the resonant frequency in accordance with some embodiments.

A shielded antenna as disclosed herein may be used as the antenna of an electronic device configured to communicate through near field communication (NFC) such as a radio frequency identification (RFID) tag or other electronic system. FIG. 9A depicts an RFID tag 900 having a resonant frequency and adapted to wirelessly communicate with a remote transceiver 901 (shown in FIG. 9C) at the resonant frequency. The RFID tag 900 includes an antenna 910 comprising a plurality of substantially concentric loops 911. A shield 920 is disposed on the antenna 910 and includes a plurality of electrically isolated segments 921, which may be metal segments in some embodiments. The shield 920 can reduce the free-space quality factor of the antenna 910 by less than about 40% at the resonant frequency of the RFID tag. The shield 920 can reduce the free-space quality factor of the antenna by less than about 30%, less than about 20%, or even less than about 15%, for example.

Figure 9B:
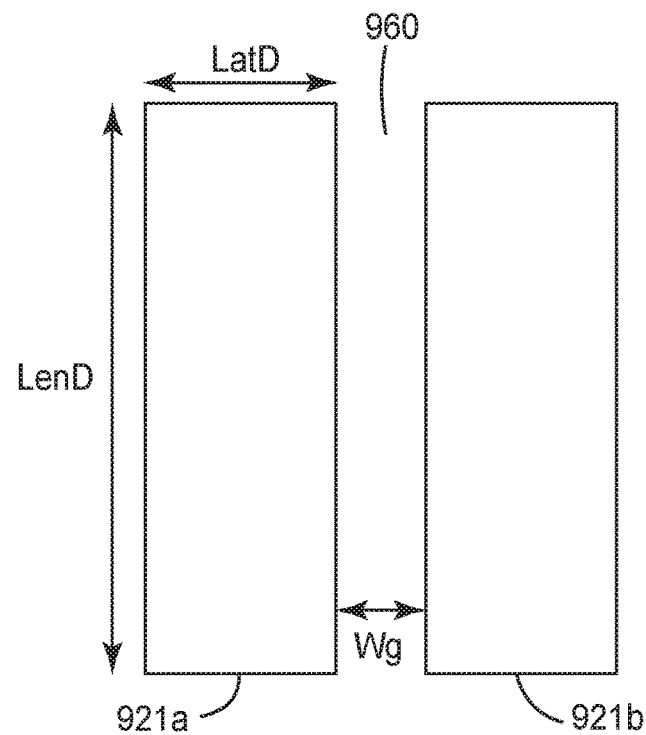
FIG. 9B is a top plan view of two electrically isolated electrically conductive segments of the shield of the RFID tag of FIG. 9A, each pair of adjacent conductive segments defining an electrically insulative non-zero gap therebetween.

The shield 920 includes a plurality of electrically isolated electrically conductive segments 921a, 921b, each pair of adjacent conductive segments defining an electrically insulative non-zero gap 960 therebetween as illustrated in FIG. 9B. The non-zero gap 960 may have a width, Wg, of less than about 1.3 mm in some embodiments. The width of the segments 921a, b may be greater than about 0.5 mm or greater than about 0.7 mm, for example. At least some of the segments 921a, 921b of the shield 920 may be elongated having a length, LenD, and a lateral dimension or width, LatD. The lateral dimension, LatD, may be less than about 0.2 mm and may be greater than about 0.02 mm, greater than about 0.05 mm, or greater than 0.07 mm. In some embodiments, LatD is in a range from about 0.07 mm to about 0.13 mm.

Figure 9C:
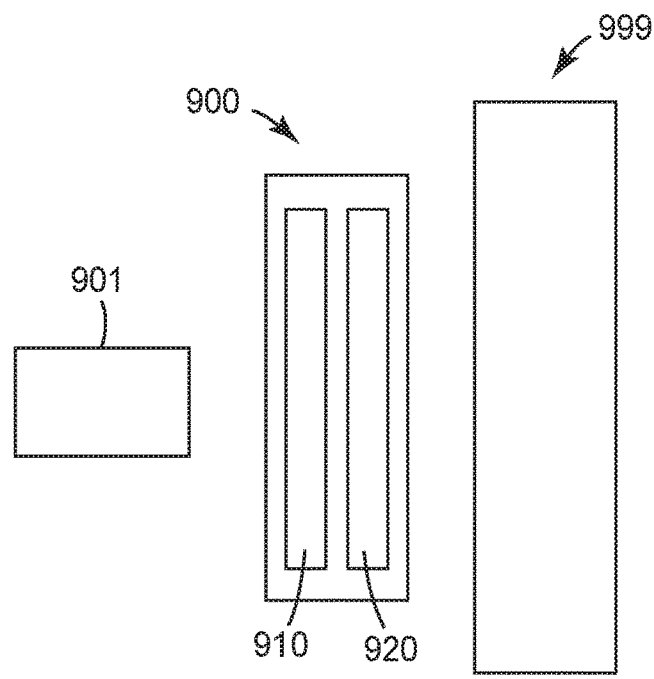
FIG. 9C shows the RFID tag of FIG. 9A placed adjacent an object with the shield between the antenna and the object in accordance with some embodiments.

FIG. 9C shows the RFID tag 900 placed adjacent an object 999 with the 920 shield between the antenna 910 and the object. The object 999 may be a human body or other object which has a relative electrical permittivity that is greater than free-space permittivity. For example, the object 999 may have a real part of the relative electrical permittivity that is about 30 and an electrical resistivity of about 0.125 ohms/meter. In some embodiments, the object 999 may have an electrical resistivity of about 0.125 ohms/meter along at least two mutually orthogonal directions. The object 999 may have an electrical resistivity of about 0.125 ohms/meter along three mutually orthogonal directions. In some embodiments, the object has an electrical resistivity of about 0.125 ohms/meter along a first direction and a different electrical resistivity along an orthogonal second direction.

In some embodiments, the object 999 has a real part of a relative electrical permittivity of about 30 and an electrical resistivity of about 0.125 ohms/meter. The antenna 910 and shield 920 may be configured such that placing the RFID tag 900 adjacent the object 999 with the shield 920 between the antenna 910 and the object 999 causes the resonant frequency of the RFID tag 900 to shift by less than about 5%. In some embodiments, the resonant frequency of the RFID tag 900 may shift more than about 0.5%. In some embodiments, the resonant frequency of the RFID tag may shift between about 0.5% to about 4%.

In some embodiments, the antenna 910 and shield 920 are configured such that placing the RFID tag 900 adjacent the object 999 with the shield 920 between the antenna 910 and the object 999 causes the reactance of the antenna 910 to shift by less than about 10% at a frequency of about 10 MHz, or less than about 8% at about 10 MHz, or less than about 6% at about 10 MHz, or less than about 4% at 10 MHz, or even less than about 2% at 10 MHz. In some embodiments, when the RFID tag 900 is placed adjacent the object 999, the resonant frequency of the RFID tag 900 shifts by less than about 4%, or less than about 3%, or less than about 2.5%, or even less than about 2%.

EXAMPLES

Figure 10:
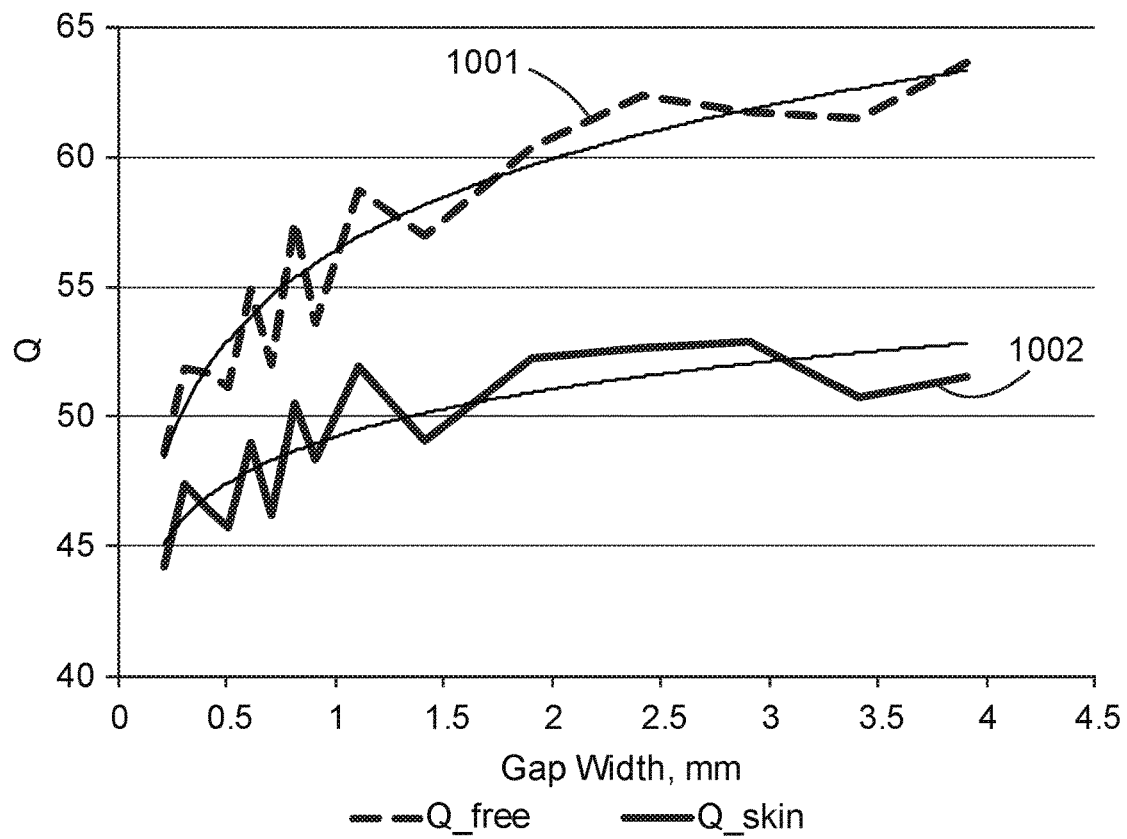
FIG. 10 depicts graphs of the Q factor of the shielded antenna vs. the width of the gap between 0.10 mm conductive segments for the general shielded antenna configuration shown generally in FIG. 7A through 7C.

Various aspects of a segmented shielded antenna were modeled. FIG. 10 depicts graphs of the Q factor of the shielded antenna vs. the width of the gap between 0.10 mm conductive segments for the shielded antenna configuration shown generally in FIG. 7A through 7C. Graph 1001 shows the Q factor vs. gap width for the shielded antenna in free space. Graph 1002 shows the Q factor vs. gap width for the shielded antenna adjacent to skin. It will be appreciated that the graph 1002 shows highest Q factor for a gap width in a range of about 2 mm to about 3 mm in this example.

Figure 11:
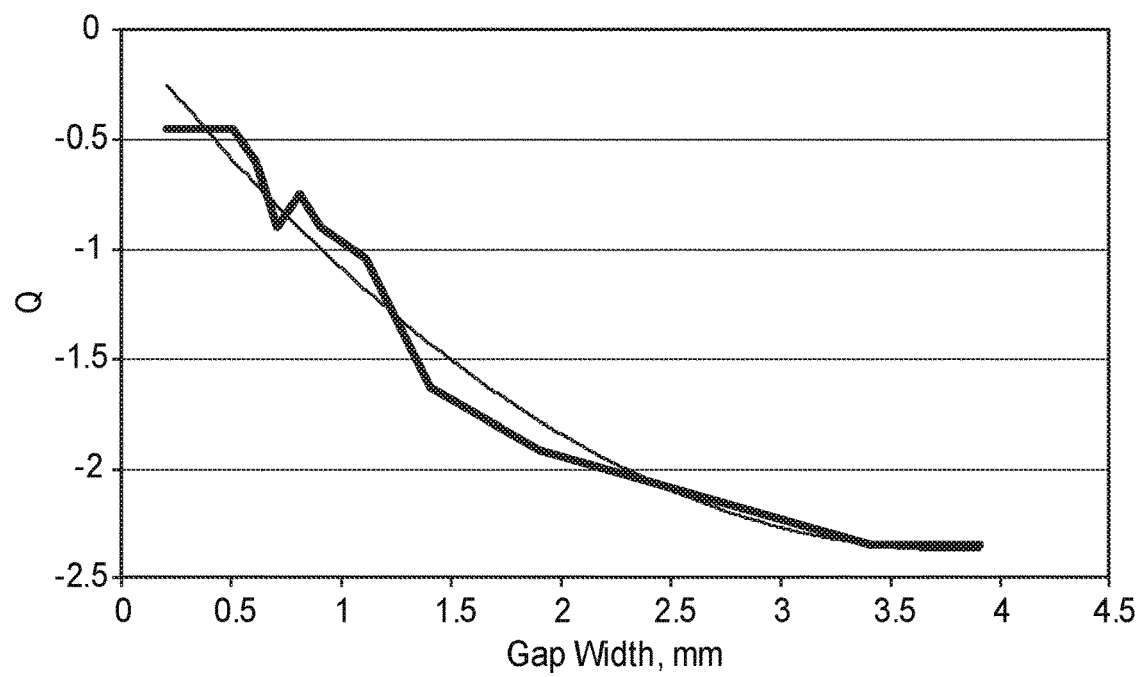
FIG. 11 is a graph showing the percent resonant frequency shift of the antenna when placed adjacent skin vs. width of the gap between 0.10 mm conductive segments for the shielded antenna configuration shown generally in FIG. 7A through 7C.

The graph of FIG. 11 shows the percent resonant frequency shift of the shielded antenna when placed adjacent skin as a function of the width of the gap between 0.10 mm conductive segments for the shielded antenna configuration shown generally in FIG. 7A through 7C. The frequency shift generally increases with gap width and appears to level off at a gap width of about 3.5 mm.

Figure 12A:
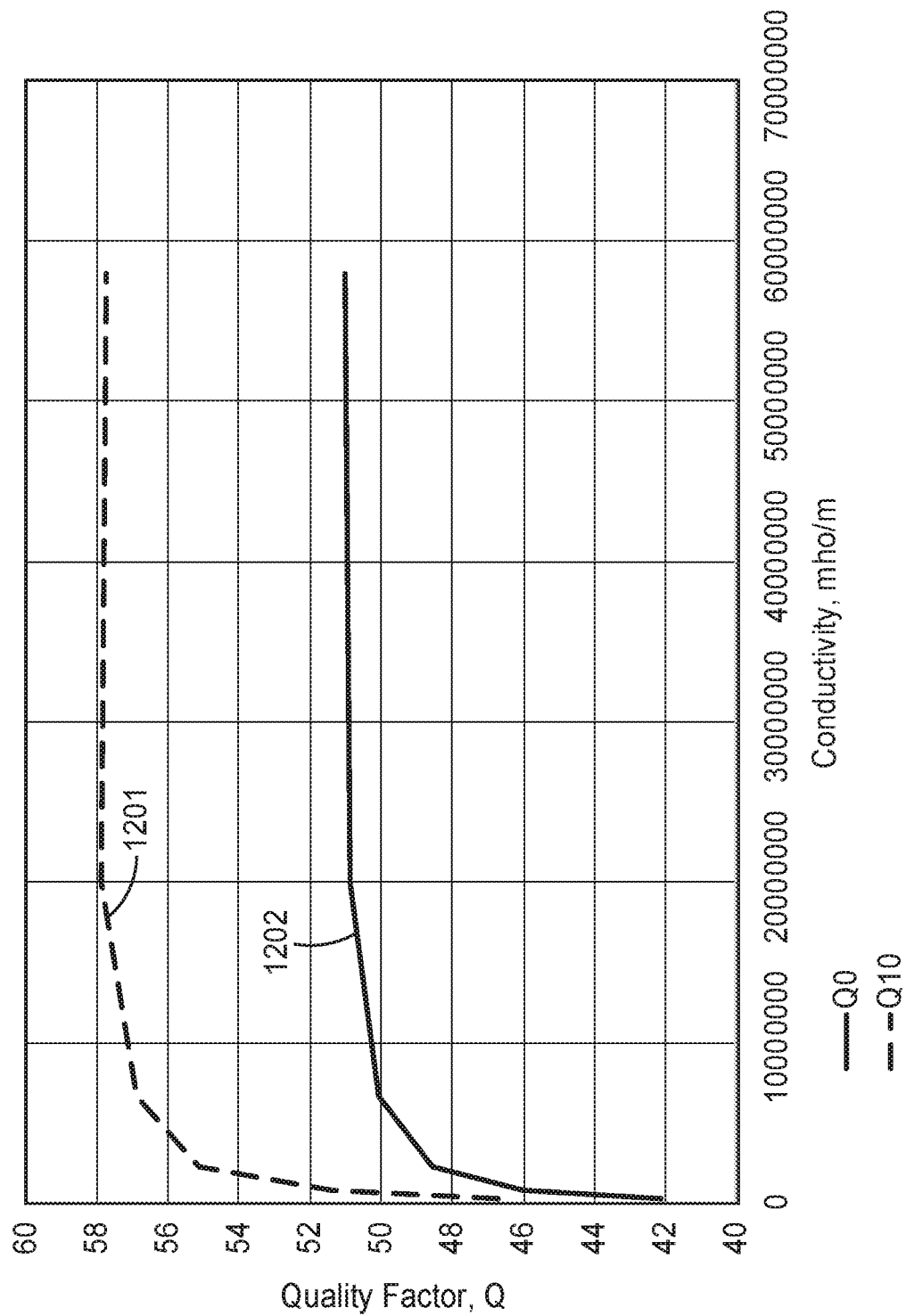
FIG. 12A shows graphs of the quality factor with respect to the conductivity of the segments expressed in mhos/meter in accordance with some embodiments.
Figure 12B:
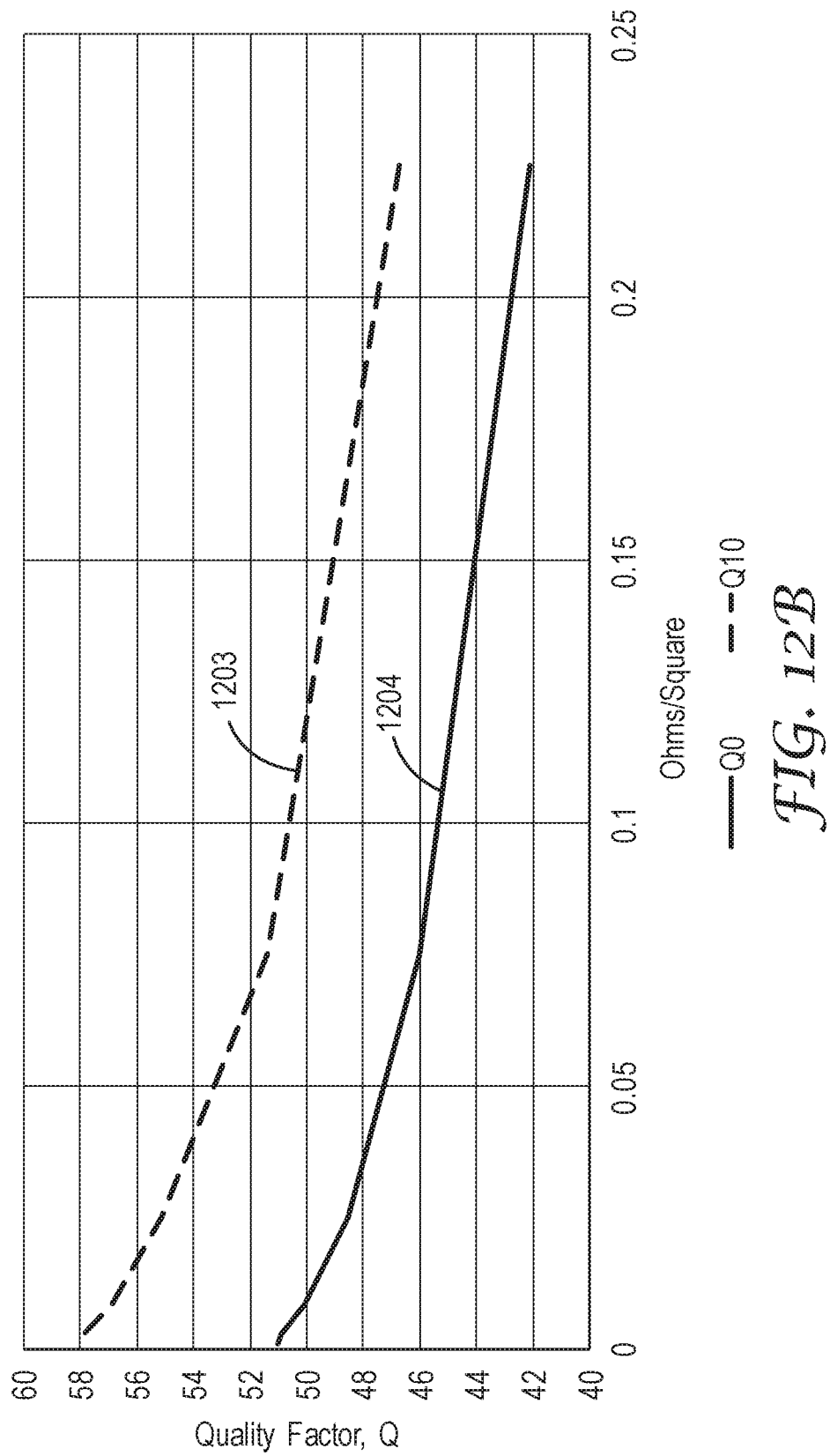
FIG. 12B shows graphs of the quality factor with respect to the conductivity of the segments expressed in ohms/square in accordance with some embodiments.

FIG. 12A shows graphs of the quality factor of a shielded antenna with respect to the conductivity of the segments expressed in mhos/meter for free-space 1201 and adjacent skin 1202. FIG. 12B shows graphs of the quality factor of a shielded antenna with respect to the conductivity of the segments expressed in ohms/square for free-space 1203 and adjacent skin 1204.

Figure 13A:
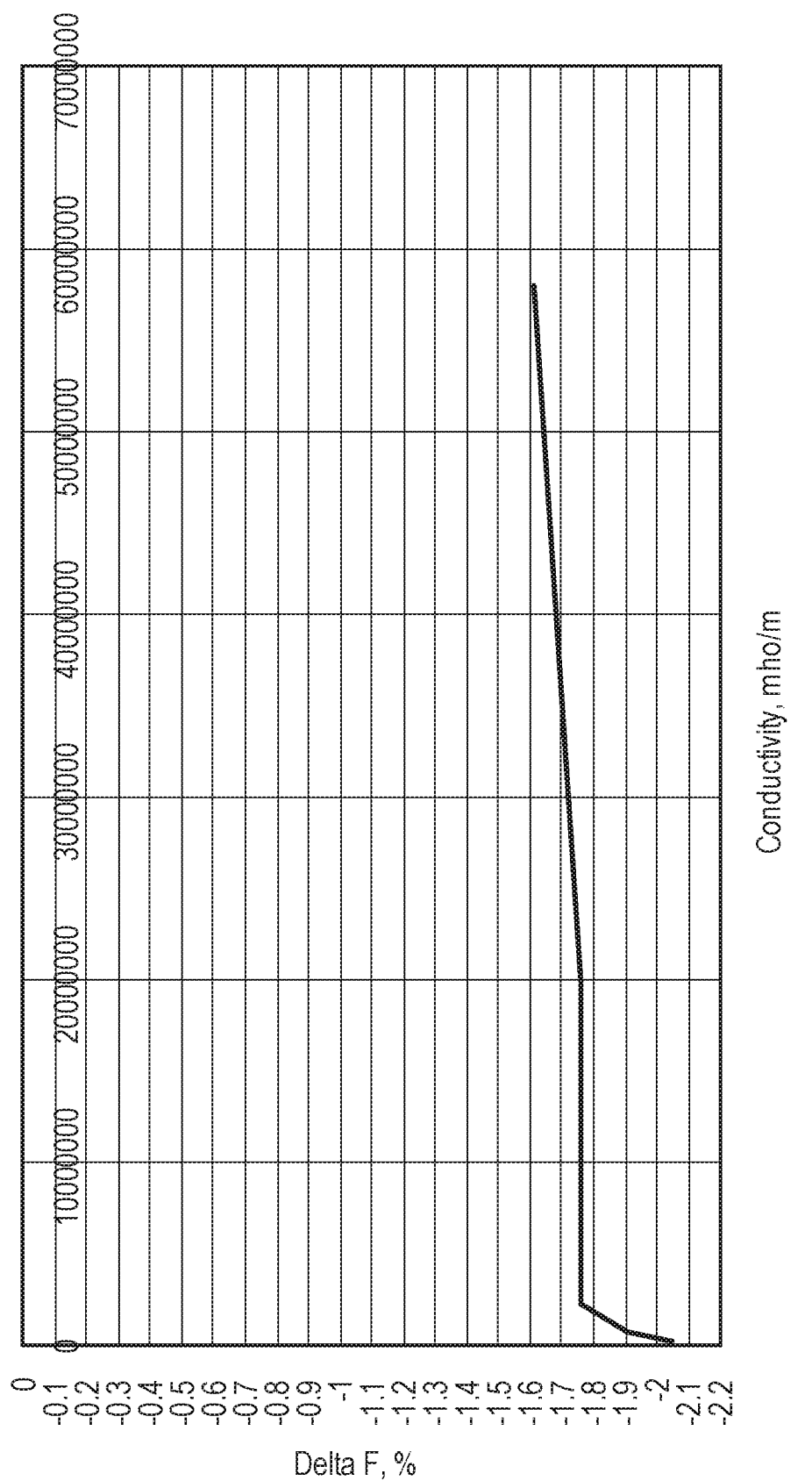
FIG. 13A shows a graph illustrating the shift in resonant frequency of the antenna when the shield is added in free space.
Figure 13B:
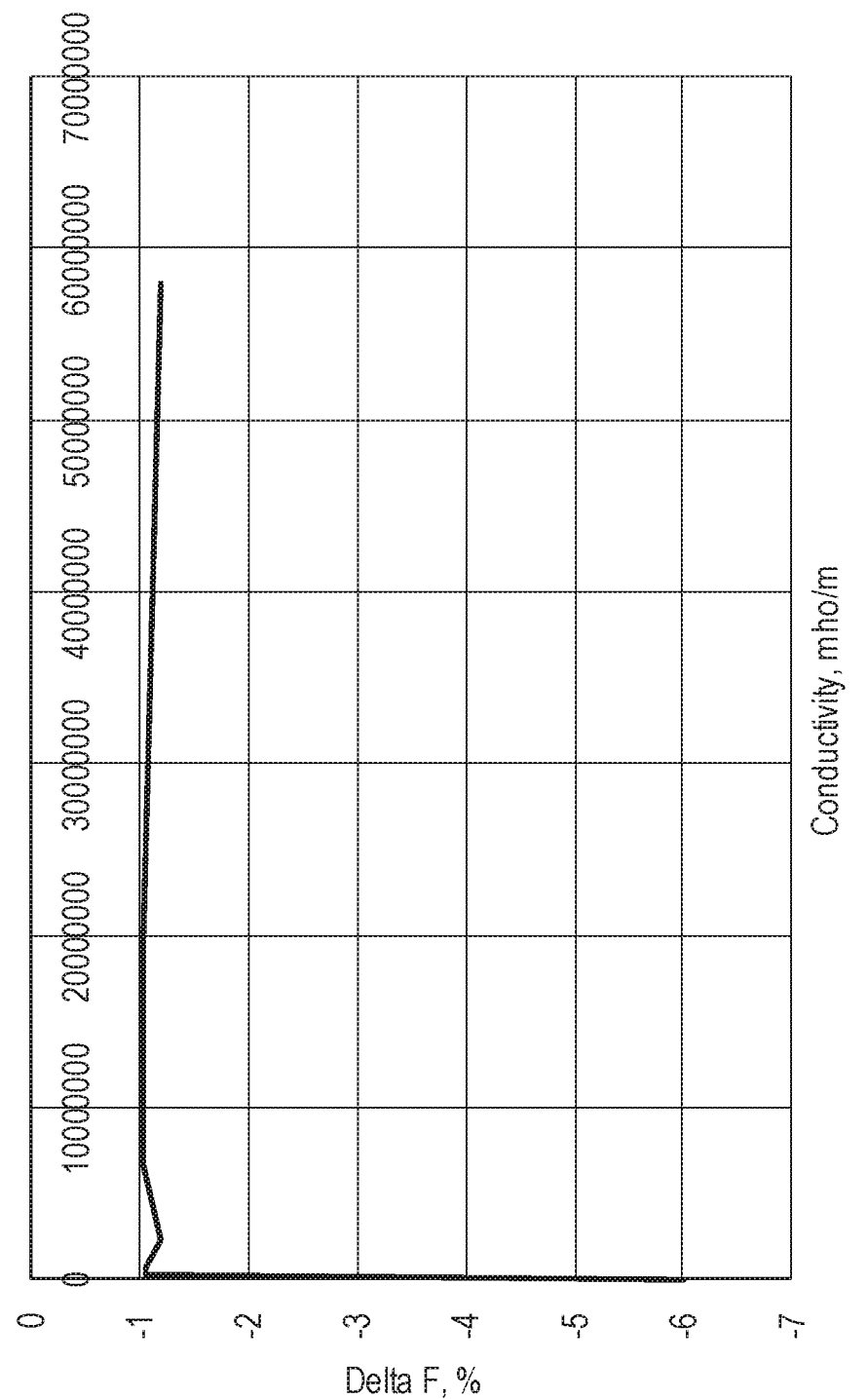
FIG. 13B shows a graph illustrating the shift in resonant frequency of the antenna when the shield is added adjacent skin.

FIG. 13A shows a graph illustrating the shift in resonant frequency of the antenna when the shield is added in free space. FIG. 13B shows a graph illustrating the shift in resonant frequency of the antenna when the shield is added adjacent skin.

Simulation results NFC tags are provided in Table 1. The resultant quality factor (Antenna Q) and resonant frequency shift (% Frequency Shift) were evaluated. The quality factor, Q, is an indicator of the ability to transfer power from a NFC reader to the tag, with higher Q generally enabling better power transfer. In many implementations, power transfer to an NFC tag is generally optimized when the resonant frequency of the tag is at 13.56 MHz. NFC tags can typically be read so long as adequate power is being transferred to the NFC tag, thus the ability to transfer power to a tag is indicative of the potential read range for that tag.

The simulation results provided the resonant frequency to the nearest 100 kHz, limiting the simulated resonant frequency precision to about 0.5%. In the case of simulation number 3, a shift in resonant frequency was not detected within the precision of the simulation. Simulations 1 and 2 were for a 14 turn antenna as generally depicted in FIGS. 1 and 2 without a shield. The results of simulations 1 and 2 show that the NFC tag of this type is sensitive to the proximity of skin, with a reduction in the Q and a 6% reduction in the resonant frequency.

Simulation 3 was for an NFC tag having a shielded antenna including a 14 turn antenna as generally depicted in FIG. 2 with a shield with one slot. Simulation 4 modeled an NFC tag having a shielded antenna including a 14 turn antenna as generally depicted in FIG. 2 and a shield with four slots as generally depicted in FIG. 8A. Simulations 5 and 6 compare the Q factor and resonant frequency shift of a NFC tag with a shielded antenna having a segmented shield as generally shown in FIG. 1 in free space with respect to the same NFC tag placed next to skin. Simulations 3-6 indicate that additional segments in the shield help recover the Q to that of simulation 2, while at the same time also providing better frequency stability in the close proximity to skin than that of the NFC tag of simulation 2.

TABLE 1

Simulation Results

| Simulation Number | Shield Configuration | Environment | Antenna Q | % Frequency Shift | Tag Voltage |
|---|---|---|---|---|---|
| 1 | None | Free Space | 66 | Ref. Value | 6.5 volts |
| 2 | None | On Skin | 47 | −6% | — |
| 3 | Single Gap | On Skin | 11 | <0.5% | — |
| 4 | 4 Gaps | On Skin | 31 | — | — |
| 5 | Segmented | Free Space | 58 | Ref. Value | — |
| 6 | Segmented | On Skin | 48 | −0.7% | 6.4 volts |

Based on the modeling and simulations of various tag configurations, a NFC tag with a segmented shield, e.g. as generally shown in FIG. 1, can outperform a tag without a shield in the close proximity to skin. The frequency shifts may be due to the high permittivity of the skin, which causes an increase of the inter-winding capacitance of the multi-turn antenna, which in turn causes a decrease in the resonant frequency. However, a much smaller frequency shift is introduced in the shielded tag because the inter-winding capacitance is largely shielded from the external dielectric (i.e., skin) minimizing the potential for an external dielectric to influence the turn-to-turn parasitic capacitance. It is also noted that the more highly segmented shields provide a greater Q, but apparently at the expense of a slight increase in sensitivity of the resonant frequency to the external dielectric. Also noted is in the simulations, the Q factor of the non-shielded configuration drops 28% when placed on skin, whereas with the segmented configuration the Q factor drops 18% when placed on skin, and the free-space Q factor of the segmented configuration is only 11% lower than the free-space configuration of the unshielded tag. Simulation 6 shows that the segmented configuration on skin delivers nearly the same voltage to the NFC integrated circuit as an unshielded configuration in free space.

Embodiments include the following enumerated items:
Item 1. A shielded antenna, comprising:
a spiral antenna comprising a plurality of substantially concentric loops; and a shield disposed on the spiral antenna and comprising a plurality of electrically isolated electrically conductive segments forming a regular pattern, such that in a top plan view, at least one segment overlaps a portion of at least two loops, and at least one pair of adjacent conductive segments defines an electrically insulative gap therebetween.

Item 2. The shielded antenna of item 1, wherein the shield is disposed only on one side of the spiral antenna.

Item 3. The shielded antenna of any of items 1 through 2, wherein each segment overlaps a portion of at least two loops.

Item 4. The shielded antenna of any of items 1 through 3, wherein each segment overlaps a portion of at least three loops.

Item 5. The shielded antenna of any of items 1 through 3, wherein each segment overlaps a portion of at least four loops.

Item 6. The shielded antenna of any of items 1 through 5, wherein each segment extends at least between innermost and outermost perimeters of the shield.

Item 7. The shielded antenna of any of items 1 through 6, wherein a real part of a relative magnetic permeability of at least one segment is in a range from about 1 to about 10 at room temperature and a frequency of about 10 MHz.

Item 8. The shielded antenna of any of items 1 through 6, wherein a real part of a relative magnetic permeability of each segment is in a range from about 1 to about 10 at room temperature and a frequency of about 10 MHz.

Item 9. The shielded antenna of any of items 1 through 8, wherein in a top plan view, respective innermost and outermost perimeters of the antenna and the shield are substantially coincident with each other.

Item 10. The shielded antenna of any of items 1 through 9, wherein each conductive segment in the plurality of electrically isolated electrically conductive segments is a polygon.

Item 11. The shielded antenna of any of items 1 through 9, wherein each conductive segment in the plurality of electrically isolated electrically conductive segments is a tetragon.

Item 12. The shielded antenna of any of items 1 through 11, wherein in a top plan view, each pair of adjacent conductive segments defines an electrically insulative gap therebetween.

Item 13. The shielded antenna of item 12, wherein a maximum width of the gap is at least 10 times smaller than a minimum lateral dimension of each conductive segment in the adjacent conductive segments.

Item 14. The shielded antenna of item 12, wherein in a top plan view, a minimum width of the gap is at least 10 times greater than a maximum lateral dimension of each conductive segment in the adjacent conductive segments.

Item 15. The shielded antenna of any of items 1 through 14, wherein when the shielded antenna is laid flat, the conductive segments in the plurality of electrically isolated electrically conductive segments lie in a same plane.

Item 16. The shielded antenna of any of items 1 through 15, wherein when the shielded antenna is laid flat, no two conductive segment in the plurality of electrically isolated electrically conductive segments overlap one another.

Item 17. The shielded antenna of any of items 1 through 16, wherein in a top plan view, at least one segment overlaps a portion of each loop.

Item 18. The shielded antenna of any of items 1 through 16, wherein in a top plan view, each segment overlaps a portion of each loop.

Item 19. The shielded antenna of any of items 1 through 18 comprising a dielectric layer disposed between the spiral antenna and the shield.

Item 20. The shielded antenna of any of items 1 through 19, wherein the spiral antenna has a polygonal shape.

Item 21. The shielded antenna of any of items 1 through 20, wherein in a top plan view, at least one conductive segment overlaps two spaced apart portions of a same loop.

Item 22. The shielded antenna of any of items 1 through 20, wherein in a top plan view, each conductive segment overlaps two spaced apart portions of a same loop.

Item 23. The shielded antenna of any of items 1 through 22, wherein in a top plan view, at least one conductive segment overlaps a portion of each loop in the at least two loops in an overlap region, a first edge of the at least one conductive segment being substantially perpendicular to the loop at the overlap region.

Item 24. The shielded antenna of any of items 1 through 22, wherein in a top plan view, each conductive segment overlaps a portion of each loop in the at least two loops in an overlap region, a first edge of the conductive segment being substantially perpendicular to the loop at the overlap region.

Item 25. The shielded antenna of item 24, wherein a different second edge of the segment is substantially perpendicular to the loop at the overlap region.

Item 26. The shielded antenna of any of items 1 through 25, wherein the antenna comprises a pad portion for mounting an integrated circuit, the shield comprising a segment that in a top plan view, is substantially co-extensive with the pad portion.

Item 27. The shielded antenna of any of items 1 through 26, wherein the antenna comprises a pad portion for mounting an integrated circuit, the shield comprising two or more segments that in combination and in a top plan view, are substantially co-extensive with the pad portion.

Item 28. The shielded antenna of any of items 1 through 27, wherein at least one segment is electrically floating.

Item 29. The shielded antenna of any of items 1 through 28, wherein each segment is electrically floating.

Item 30. The shielded antenna of any of items 1 through 29, wherein at least two segments are at different potentials.

Item 31. The shielded antenna of any of items 1 through 30, wherein the shield is substantially planar.

Item 32. The shielded antenna of any of items 1 through 31, wherein the conductive segments are integrally formed on a substrate.

Item 33. The shielded antenna of claim 1, wherein each segment has an electrical sheet resistance less than about 10 ohms/square.

Item 34. The shielded antenna of any of items 1 through 33, wherein each segment has an electrical sheet resistance less than about 1 ohms/square.

Item 35. The shielded antenna of any of items 1 through 33, wherein each segment has an electrical sheet resistance less than about 0.3 ohms/square.

Item 36. The shielded antenna of any of items 1 through 33, wherein each segment has an electrical sheet resistance less than about 0.05 ohms/square.

Item 37. The shielded antenna of any of items 1 through 36, wherein in a top plan view, the segments cover at least 5% of a projected area of the antenna.

Item 38. The shielded antenna of any of items 1 through 37, wherein for at least one segment, a diameter of a largest circle inscribed in the at least one segment is at least 5 times smaller than a largest lateral dimension of the at least one segment.

Item 39. The shielded antenna of any of items 1 through 38, wherein the conductive segments comprise one or more of copper, silver, gold, nickel, tin, carbon, carbon black, aluminum, indium, zinc, silicon, iron, tungsten, platinum, titanium, and lead.

Item 40. The shielded antenna of any of items 1 through 39, wherein the conductive segments comprise a metal alloy.

Item 41. The shielded antenna of any of items 1 through 39, wherein the conductive segments comprise at least two different materials.

Item 42. The shielded antenna of any of items 1 through 39, wherein the conductive segments comprise electrically conductive particles dispersed in a resin.

Item 43. A radio frequency identification (RFID) tag having a resonant frequency and adapted to wirelessly communicate with a remote transceiver at the resonant frequency, the RFID tag comprising:
an antenna comprising a plurality of substantially concentric loops; and
a shield disposed on the antenna and comprising a plurality of electrically isolated metal segments, the shield reducing a free-space quality factor of the antenna by less than about 40% at the resonant frequency, such that when the RFID tag is placed adjacent an object having a real part of a relative electrical permittivity of about 30 and an electrical resistivity of about 0.125 ohms/meter, the shield disposed between the antenna and the object, the resonant frequency of the RFID tag shifts by less than about 5%.

Item 44. The RFID tag of item 43, such that when the RFID tag is placed adjacent an object having a real part of a relative electrical permittivity of about 30 and an electrical resistivity of about 0.125 ohms/meter, the shield disposed between the antenna and the surface, a reactance of the antenna shifts by less than about 10% at a frequency of about 10 MHz.

Item 45. The RFID tag of any of items 43 through 44, wherein the object has an electrical resistivity of about 0.125 ohms/meter along at least two mutually orthogonal directions.

Item 46. The RFID tag of any of items 43 through 44, wherein the object has an electrical resistivity of about 0.125 ohms/meter along three mutually orthogonal directions.

Item 47. The RFID tag of any of item 43, wherein the object has an electrical resistivity of about 0.125 ohms/meter along a first direction and a different electrical resistivity along an orthogonal second direction.

Item 48. The RFID tag of any of items 43 through 47, wherein the reactance of the antenna shifts by less than about 8% at a frequency of about 10 MHz.

Item 49. The RFID tag of any of items 43 through 47, wherein the reactance of the antenna shifts by less than about 6% at a frequency of about 10 MHz.

Item 50. The RFID tag of any of items 43 through 47, wherein the reactance of the antenna shifts by less than about 4% at a frequency of about 10 MHz.

Item 51. The RFID tag of any of items 43 through 47, wherein the reactance of the antenna shifts by less than about 2% at a frequency of about 10 MHz.

Item 52. The RFID tag of any of items 43 through 51, wherein the shield reduces the free-space quality factor of the antenna by less than about 30%.

Item 53. The RFID tag of any of items 43 through 51, wherein the shield reduces the free-space quality factor of the antenna by less than about 20%.

Item 54. The RFID tag of any of items 43 through 51, wherein the shield reduces the free-space quality factor of the antenna by less than about 15%.

Item 55. The RFID tag of any of items 43 through 54, wherein the resonant frequency of the RFID tag shifts by less than about 4%.

Item 56. The RFID tag of any of items 43 through 54, wherein the resonant frequency of the RFID tag shifts by less than about 3%.

Item 57. The RFID tag of any of items 43 through 54, wherein the resonant frequency of the RFID tag shifts by less than about 2.5%.

Item 58. The RFID tag of any of items 43 through 54, wherein the resonant frequency of the RFID tag shifts by less than about 2%.

Item 59. A shielded antenna, comprising:
an antenna;
a first shield disposed on the antenna and comprising a plurality of spaced apart electrically conductive first segments; and
a second shield disposed on the antenna and comprising a plurality of spaced apart electrically conductive second segments, such than in a top plan view, at least one first segment partially overlaps each of at least two adjacent second segments, and at least one second segment partially overlaps each of at least two adjacent first segments.

Item 60. The shielded antenna of item 59, wherein each first segment partially overlaps each of at least two adjacent second segments, and each second segment partially overlaps each of at least two adjacent first segments.

Item 61. The shielded antenna of any of items 59 through 60, wherein the first and second shields are disposed on a same side of the antenna.

Item 62. A shielded antenna, comprising:
an antenna;
a first shield disposed on the antenna and comprising a plurality electrically conductive first segments separated by a plurality of first gaps; and
a second shield disposed on the antenna and comprising a plurality of electrically conductive second segments separated by a plurality of second gaps, such than in a top plan view, at least one first gap is completely overlapped by a second segment, and at least one second gap is completely overlapped by a first segment.

Item 63. The shielded antenna of item 62, wherein each first gap is completely overlapped by a second segment, and each second gap is completely overlapped by a first segment.

Item 64. The shielded antenna of any of items 62 through 63, wherein the first and second shields are disposed on a same side of the antenna.

Item 65. A shielded antenna, comprising:
an antenna comprising an electrically conductive trace extended along a length of the trace between first and second ends of the antenna; and
a shield disposed on the antenna and comprising a plurality of spaced apart electrically isolated electrically conductive elongated segments forming a regular pattern, each segment elongated along a length direction of the segment, such than in a top plan view, each segment traverses the conductive trace at at least two different locations along the length of the trace, the length direction of the segment perpendicular to the trace at each of the at least two different locations.

Item 66. The shielded antenna of item 65, wherein the shield is planar.

Item 67. The shielded antenna of any of items 65 through 66, wherein at least some of the elongated segments are substantially L-shaped.

Item 68. The shielded antenna of any of items 65 through 66, wherein at least some of the elongated segments are substantially U-shaped.

Item 69. The shielded antenna of any of items 65 through 68, wherein at least some of the elongated segments are substantially perpendicular to at least some other elongated segments.

Item 70. The shielded antenna of any of items 65 through 69, wherein a conductivity of at least one elongated segment is greater than about $1.0 \times 10^7$ mhos/meter.

Item 71. The shielded antenna of any of items 65 through 69, wherein a conductivity of each elongated segment is greater than about $1.0 \times 10^7$ mhos/meter.

Item 72. The shielded antenna of any of items 65 through 69, wherein a conductivity of at least one elongated segment is greater than about $2.0 \times 10^7$ mhos/meter.

Item 73. The shielded antenna of any of items 65 through 69, wherein a conductivity of each elongated segment is greater than about $2.0 \times 10^7$ mhos/meter.

Item 74. The shielded antenna of any of items 65 through 69, wherein a resistance of each elongated segment is less than about 1 ohm/square.

Item 75. The shielded antenna of any of items 65 through 69, wherein a resistance of each elongated segment is less than about 0.1 ohms/square.

Item 76. The shielded antenna of any of items 65 through 69, wherein a resistance of each elongated segment is less than about 0.01 ohms/square.

Item 77. A shielded antenna, comprising:
an antenna comprising an electrically conductive elongated trace forming a plurality of substantially concentric loops; and
a shield disposed on the antenna, the shield increasing a coupling capacitance between the loops by at least a factor of 2 and increasing an effective resistance of the elongated trace by less than a factor of 2.

Item 78. The shielded antenna of item 77, wherein the shield comprises a plurality of spaced apart electrically isolated electrically conductive segments.

Item 79. A radio frequency identification (RFID) tag having a resonant frequency and adapted to wirelessly communicate with a remote transceiver at the resonant frequency, the RFID tag comprising:
an antenna; and
a shield disposed on the antenna and comprising a plurality of electrically isolated electrically conductive segments, each pair of adjacent conductive segments defining an electrically insulative non-zero gap therebetween, the non-zero gap less than about 1.3 mm, each segment elongated and having a length and a width, the width less than about 0.2 mm, such that when the RFID tag is placed adjacent an object having a real part of a relative electrical permittivity of about 30 and an electrical resistivity of about 0.125 ohms/meter, the shield disposed between the antenna and the surface, the resonant frequency of the RFID tag shifts less than about 5%.

Item 80. The RFID tag of item 79, wherein the resonant frequency of the RFID tag shifts more than about 0.5%.

Item 81. The RFID tag of item 79, wherein the resonant frequency of the RFID tag shifts between about 0.5% to about 4%.

Item 82. The RFID tag of any of items 79 through 81, wherein the non-zero gap is greater than about 0.5 mm.

Item 83. The RFID tag of any of items 79 through 81, wherein the non-zero gap is greater than about 0.7 mm.

Item 84. The RFID tag of any of items 79 through 83, wherein the width is greater than about 0.02 mm.

Item 85. The RFID tag of any of items 79 through 83, wherein the width is greater than about 0.05 mm.

Item 86. The RFID tag of any of items 79 through 83, wherein the width is greater than about 0.07 mm.

Item 87. The RFID tag of any of items 79 through 83, wherein the width is in a range from about 0.07 mm to about 0.13 mm.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of these embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A shielded antenna, comprising:
a spiral antenna comprising a plurality of substantially concentric loops; and
a shield disposed on the spiral antenna and comprising a plurality of electrically isolated electrically conductive segments forming a regular pattern, such that in a top plan view, at least one segment overlaps a portion of at least two loops, and at least one pair of adjacent conductive segments defines an electrically insulative gap therebetween, wherein each conductive segment extends at least between innermost and outermost perimeters of the shield, and the innermost perimeter of the shield is substantially coincident with an innermost perimeter of the spiral antenna and the outermost perimeter of the shield is substantially coincident with an outermost perimeter of the spiral antenna.

2. The shielded antenna of claim 1, wherein the shield is disposed only on one side of the spiral antenna.

3. The shielded antenna of claim 1, wherein when the shielded antenna is laid flat, no two conductive segment in the plurality of electrically isolated electrically conductive segments overlap one another.

4. The shielded antenna of claim 1, wherein in a top plan view, each conductive segment overlaps a portion of each loop in the at least two loops in an overlap region, a first edge of the conductive segment being substantially perpendicular to the loop at the overlap region.

5. A radio frequency identification (RFID) tag having a resonant frequency and adapted to wirelessly communicate with a remote transceiver at the resonant frequency, the RFID tag comprising:
an antenna comprising a plurality of substantially concentric loops; and
a shield disposed on the antenna and comprising a plurality of electrically isolated metal segments, the shield reducing a free-space quality factor of the antenna by less than about 40% at the resonant frequency, such that when the RFID tag is placed adjacent an object having a real part of a relative electrical permittivity of about 30 and an electrical resistivity of about 0.125 ohms/ meter, the shield disposed between the antenna and the object, the resonant frequency of the RFID tag shifts by less than about 5%, wherein each electrically isolated metal segment extends at least between innermost and outermost perimeters of the shield and the innermost perimeter of the shield is substantially coincident with an innermost perimeter of the antenna and the outermost perimeter of the shield is substantially coincident with an outermost perimeter of the antenna.

6. A shielded antenna, comprising:
an antenna;
a first shield disposed on the antenna and comprising a plurality of spaced apart electrically conductive first segments; and
a second shield disposed on the antenna and comprising a plurality of spaced apart electrically conductive second segments, each of the plurality of electrically conductive second segments oriented in substantially the same direction as the plurality of electrically conductive first segments, such than in a top plan view, at least one first segment partially overlaps each of at least two adjacent second segments, and at least one second segment partially overlaps each of at least two adjacent first segments.

7. A shielded antenna, comprising:
an antenna;
a first shield disposed on the antenna and comprising a plurality electrically conductive first segments separated by a plurality of first gaps; and
a second shield disposed on the antenna and comprising a plurality of electrically conductive second segments separated by a plurality of second gaps, each of the plurality of electrically conductive second segments oriented in substantially the same direction as the plurality of electrically conductive first segments, such than in a top plan view, at least one first gap is completely overlapped by a second segment, and at least one second gap is completely overlapped by a first segment.

8. A shielded antenna, comprising:
an antenna comprising an electrically conductive trace extended along a length of the trace between first and second ends of the antenna, the electrically conductive trace forming a plurality of substantially concentric loops; and
a shield disposed on the antenna and comprising a plurality of spaced apart electrically isolated electrically conductive elongated segments forming a regular pattern, each segment elongated along a length direction of the segment, such than in a top plan view, each segment traverses the conductive trace at at least two different locations along the length of the trace, the length direction of the segment perpendicular to the trace at each of the at least two different locations, wherein each electrically isolated electrically conductive elongated segment extends at least between innermost and outermost perimeters of the shield, and the innermost perimeter of the shield is substantially coincident with an innermost perimeter of the antenna and the outermost perimeter of the shield is substantially coincident with an outermost perimeter of the antenna.

9. A shielded antenna, comprising:
an antenna comprising an electrically conductive elongated trace forming a plurality of substantially concentric loops; and
a shield disposed on the antenna, the shield increasing a coupling capacitance between the loops by at least a factor of 2 and increasing an effective resistance of the elongated trace by less than a factor of 2, the shield comprising a plurality of electrically isolated segments, wherein each electrically isolated segment extends at least between innermost and outermost perimeters of the shield, and the innermost perimeter of the shield is substantially coincident with an innermost perimeter of the antenna and the outermost perimeter of the shield is substantially coincident with an outermost perimeter of the antenna.

10. A radio frequency identification (RFID) tag having a resonant frequency and adapted to wirelessly communicate with a remote transceiver at the resonant frequency, the RFID tag comprising:
an antenna comprising an electrically conductive trace extended along a length of the trace between first and second ends of the antenna, the electrically conductive trace forming a plurality of substantially concentric loops; and
a shield disposed on the antenna and comprising a plurality of electrically isolated electrically conductive segments, each pair of adjacent conductive segments defining an electrically insulative non-zero gap therebetween, the non-zero gap less than about 1.3 mm, each segment elongated and having a length and a width, the width less than about 0.2 mm, such that when the RFID tag is placed adjacent an object having a real part of a relative electrical permittivity of about 30 and an electrical resistivity of about 0.125 ohms/meter, the shield disposed between the antenna and the surface, the resonant frequency of the RFID tag shifts less than about 5%, wherein each electrically isolated electrically conductive segment extends at least between innermost and outermost perimeters of the shield, and the innermost perimeter of the shield is substantially coincident with an innermost perimeter of the antenna and the outermost perimeter of the shield is substantially coincident with an outermost perimeter of the antenna.

* * * * *